US012793896B2

(12) United States Patent
Sato

(10) Patent No.: US 12,793,896 B2
(45) Date of Patent: Nov. 10, 2026

(54) MULTILAYER CERAMIC ELECTRONIC COMPONENT

(71) Applicant: KYOCERA CORPORATION, Kyoto (JP)

(72) Inventor: Hisashi Sato, Kirishima (JP)

(73) Assignee: Kyocera Corporation, Kyoto (JP)

( * ) Notice: Subject to any disclaimer, the term of this patent is extended or adjusted under 35 U.S.C. 154(b) by 134 days.

(21) Appl. No.: 18/872,893

(22) PCT Filed: Jun. 7, 2023

(86) PCT No.: PCT/JP2023/021121

§ 371 (c)(1),
(2) Date: Dec. 9, 2024

(87) PCT Pub. No.: WO2023/243504

PCT Pub. Date: Dec. 21, 2023

(65) Prior Publication Data

US 2025/0329495 A1 Oct. 23, 2025

(30) Foreign Application Priority Data

Jun. 16, 2022 (JP) ................................ 2022-097492

(51) Int. Cl.
*H01G 4/012* (2006.01)
*H01G 4/224* (2006.01)
(Continued)

(52) U.S. Cl.
CPC ............ *H01G 4/012* (2013.01); *H01G 4/224* (2013.01); *H01G 4/232* (2013.01); *H01G 4/30* (2013.01)

(58) Field of Classification Search
CPC ........ H01G 4/012; H01G 4/224; H01G 4/232; H01G 4/30
See application file for complete search history.

(56) References Cited

U.S. PATENT DOCUMENTS

2013/0033154 A1 2/2013 Sakuratani et al.
2013/0241361 A1* 9/2013 Lee ....................... H01G 4/012 336/200
(Continued)

FOREIGN PATENT DOCUMENTS

JP H01118424 U 8/1989
JP H08316086 A 11/1996
(Continued)

*Primary Examiner* — Michael P McFadden
(74) *Attorney, Agent, or Firm* — Volpe Koenig

(57) ABSTRACT

A multilayer ceramic electronic component includes a stack, a first external electrode, a second external electrode, and protective layers. The stack includes an active portion including first dielectric layers and internal electrode layers alternately stacked on one another, covers at two ends of the active portion, and first and second side surfaces. The first and second external electrodes are connected to different internal electrode layers. The protective layers are on the first and second side surfaces, contain a same main component as the first dielectric layers, and each have a thickness less than or equal to 30 μm. Each of the covers includes second dielectric layers and dummy electrode layers alternately stacked on one another. An interval between the dummy electrode layers is one to eight times inclusive an interval between the internal electrode layers.

6 Claims, 16 Drawing Sheets

(51) Int. Cl.
*H01G 4/232* (2006.01)
*H01G 4/30* (2006.01)

(56) References Cited

U.S. PATENT DOCUMENTS

| | | | | |
|---|---|---|---|---|
| 2014/0240895 | A1* | 8/2014 | Lee | H01G 4/12 29/25.42 |
| 2015/0318110 | A1* | 11/2015 | Lee | H01G 4/30 361/301.4 |
| 2016/0381802 | A1 | 12/2016 | Taniguchi et al. | |
| 2019/0172646 | A1 | 6/2019 | Kim et al. | |
| 2020/0027658 | A1* | 1/2020 | Lee | H01G 4/012 |
| 2020/0066450 | A1* | 2/2020 | Uenishi | H01G 4/012 |
| 2020/0111613 | A1 | 4/2020 | Teraoka et al. | |
| 2020/0350123 | A1 | 11/2020 | Kim et al. | |
| 2022/0181087 | A1 | 6/2022 | Park et al. | |

FOREIGN PATENT DOCUMENTS

| | | | |
|---|---|---|---|
| JP | 2012-169620 | A | 9/2012 |
| JP | 2013-051392 | A | 3/2013 |
| JP | 2013-93374 | A | 5/2013 |
| JP | 2015-211209 | A | 11/2015 |
| JP | 2017-17310 | A | 1/2017 |
| JP | 2020-57738 | A | 4/2020 |

* cited by examiner

MULTILAYER CERAMIC ELECTRONIC COMPONENT

TECHNICAL FIELD

The present disclosure relates to a multilayer ceramic electronic component.

BACKGROUND OF INVENTION

A known technique for multilayer ceramic electronic components is described in, for example, Patent Literature 1.

CITATION LIST

Patent Literature

Patent Literature 1: Japanese Unexamined Patent Application Publication No. 2012-169620

SUMMARY

In an aspect of the present disclosure, a multilayer ceramic electronic component includes a stack, a first external electrode, a second external electrode, and protective layers. The stack is a substantially rectangular prism and includes an active portion and covers at two ends of the active portion in a predetermined direction. The active portion includes a plurality of first dielectric layers and a plurality of internal electrode layers alternately stacked on one another in the predetermined direction. The stack includes a first surface and a second surface opposite to each other in the predetermined direction, a first side surface and a second side surface opposite to each other, and a first end face and a second end face opposite to each other. The first external electrode extends from the first end face to at least one of the first surface or the second surface. The second external electrode extends from the second end face to the at least one of the first surface or the second surface. The protective layers are on the first side surface and the second side surface. The protective layers contain a same main component as the plurality of first dielectric layers. The first external electrode is connected to an internal electrode layer of the plurality of internal electrode layers, and the second external electrode is connected to an internal electrode layer of the plurality of internal electrode layers different from the internal electrode layer connected to the first external electrode. Each of the protective layers has a thickness less than or equal to 30 μm. Each of the covers includes a plurality of second dielectric layers and a plurality of dummy electrode layers alternately stacked on one another in the predetermined direction. The plurality of second dielectric layers contains a same main component as the plurality of first dielectric layers. The plurality of dummy electrode layers contains a same main component as the plurality of internal electrode layers. An interval between the plurality of dummy electrode layers is one to eight times inclusive an interval between the plurality of internal electrode layers.

BRIEF DESCRIPTION OF THE DRAWINGS

The objects, features, and advantages of the present disclosure will be more apparent from the following detailed description and the drawings.

DESCRIPTION OF EMBODIMENTS

Figure 1:
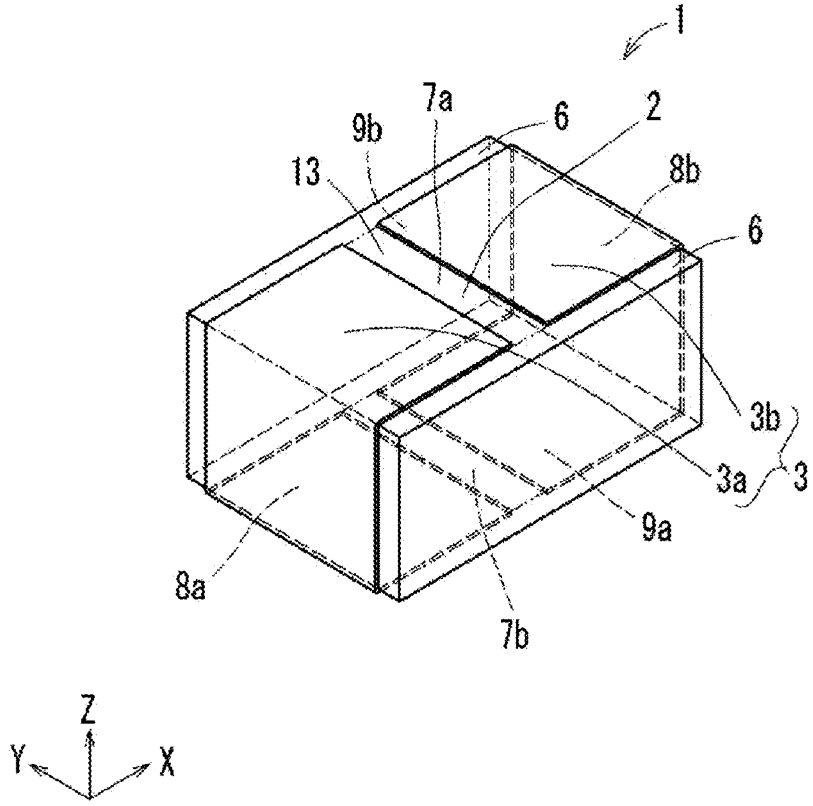
FIG. 1 is a perspective view of a multilayer ceramic capacitor according to an embodiment.

Electronic devices have been smaller and more functional and are to incorporate smaller electronic components. A multilayer ceramic capacitor as an example of such electronic components typically has a length of not more than 1 mm on each side. The multilayer ceramic capacitor is to be further smaller and have a larger capacity.

To be smaller and have a larger capacity, a known multilayer ceramic capacitor includes thinner side margins (also referred to as protective layers), which do not contribute to the capacitance. To allow the protective layers to be thinner, a known method includes cutting a multilayer base including dielectric layers and internal electrode layers alternately stacked on one another to produce stacks with the internal electrode layers exposed on their side surfaces, forming the thin protective layers on the side surfaces of the stacks, and then firing the stacks and the protective layers together. When the protective layers are thinner, the above method is more likely to cause the protective layers to crack due to a mismatch between the shrinkage behaviors of a capacitance portion (also referred to as an active portion) and non-capacitance portions (also referred to as covers) in each of the stacks during firing. A multilayer ceramic capacitor described in Patent Literature 1 reduces a mismatch between the shrinkage behaviors of the active portion and the covers by adjusting the particle diameter of the ceramic material of the active portion and the particle diameter of the ceramic material of the covers.

In the known multilayer ceramic capacitor, the shrinkage behaviors of the active portion and the covers are difficult to control. This may cause the thinner protective layers to crack, possibly lowering the reliability of the multilayer ceramic capacitor.

A multilayer ceramic electronic component according to one or more embodiments of the present disclosure will now be described with reference to the drawings. A multilayer ceramic capacitor will now be described as an example multilayer ceramic electronic component. However, in one or more embodiments of the present disclosure, the multilayer ceramic electronic component is not limited to the multilayer ceramic capacitor, and may be any of other multilayer ceramic electronic components, for example, a multilayer piezoelectric element, a multilayer thermistor element, a multilayer chip coil, and a multilayer ceramic substrate. The drawings used hereafter are schematic and are not necessarily drawn to scale relative to the actual number of stacked layers and the actual size of each component in the drawings. Although the multilayer ceramic electronic component according to an embodiment may be oriented with any sides being upward or downward, in some of the drawings, the orthogonal XYZ-coordinate system is defined herein for ease of explanation. Hereafter, a positive Z-direction is upward, and directional terms such as an upper end and a lower end are used accordingly. An X-direction may be referred to as a first direction or a length direction. A Y-direction may be referred to as a second direction or a width direction. A Z-direction may be referred to as a third direction or a height direction. For ease of explanation, internal electrode layers and dummy electrode layers are hatched in some of the drawings.

Figure 2:
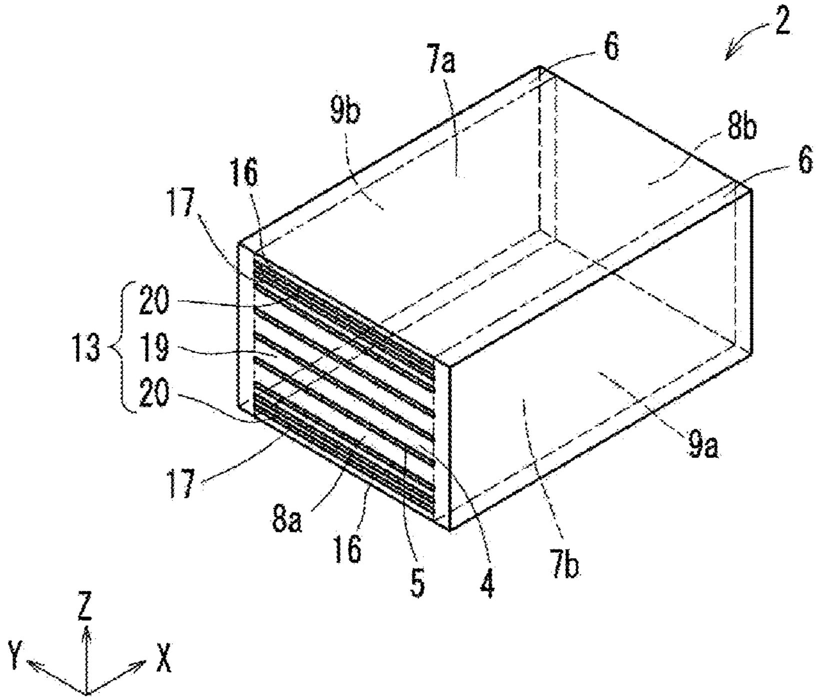
FIG. 2 is a perspective view of a base component of the multilayer ceramic capacitor in FIG. 1.
Figure 3:
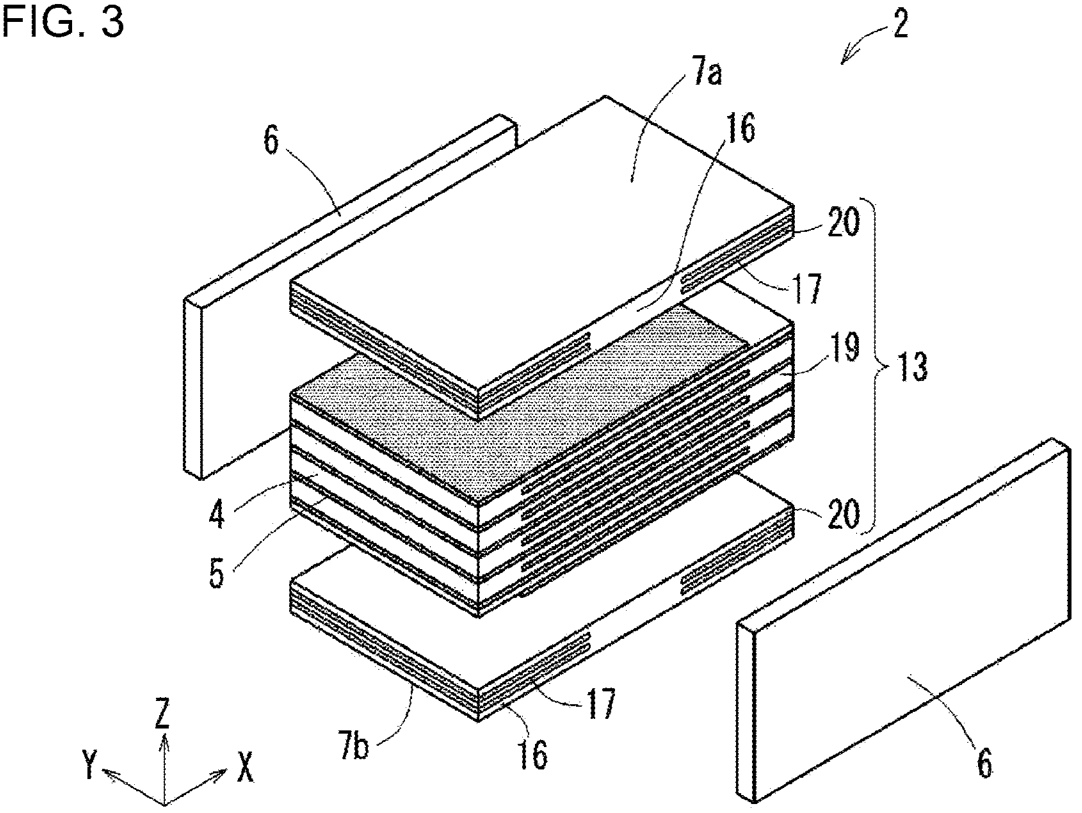
FIG. 3 is an exploded perspective view of the base component in FIG. 2.
Figure 4:
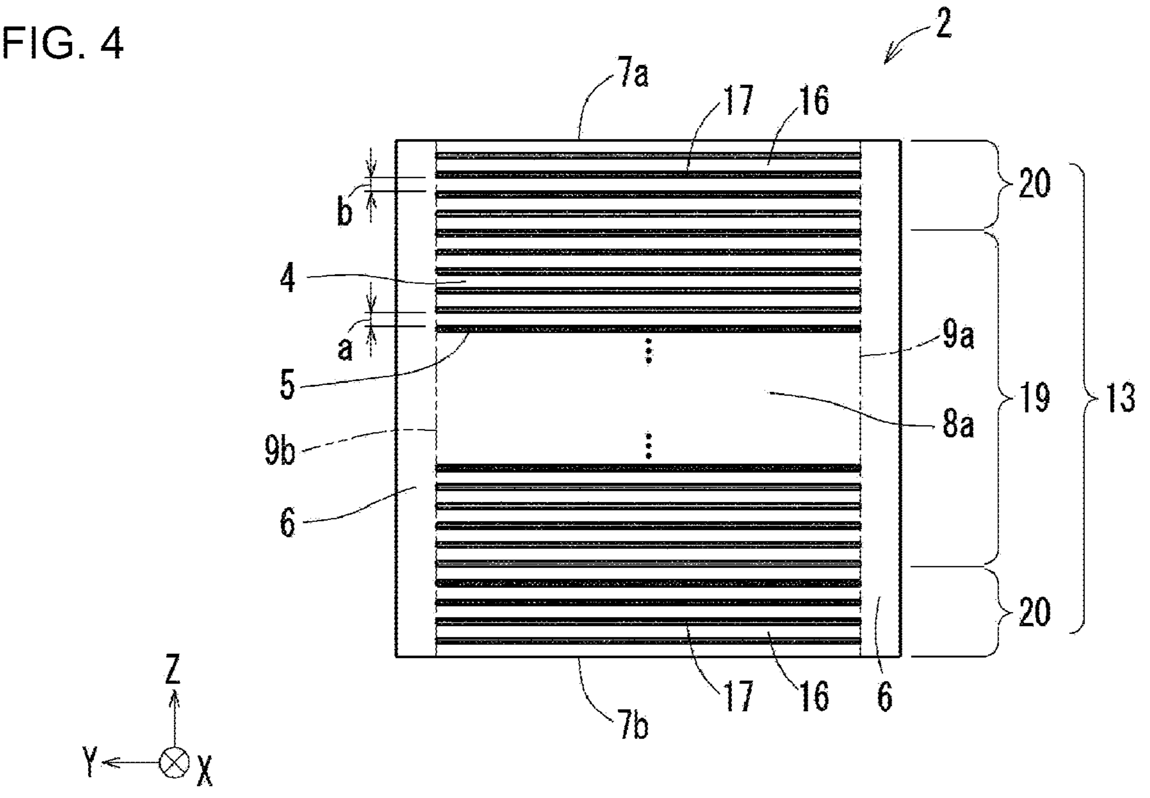
FIG. 4 is a side view of the base component in FIG. 3.
Figure 5A:
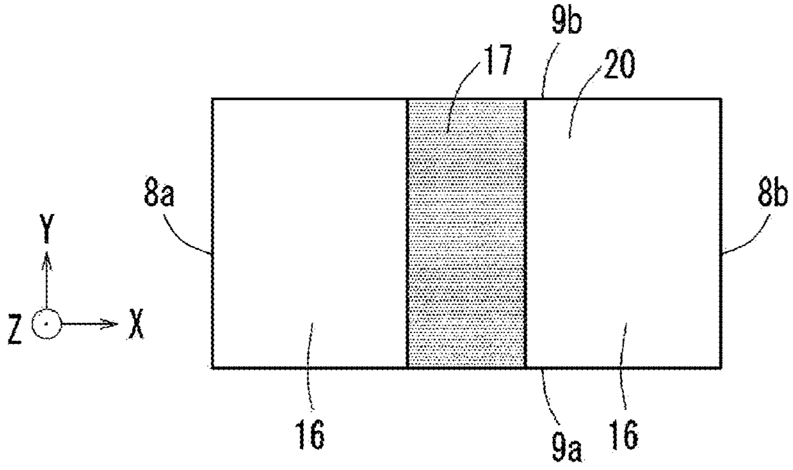
FIG. 5A is a plan view of a dummy electrode layer in the multilayer ceramic capacitor in FIG. 1, illustrating its example pattern.
Figure 5B:
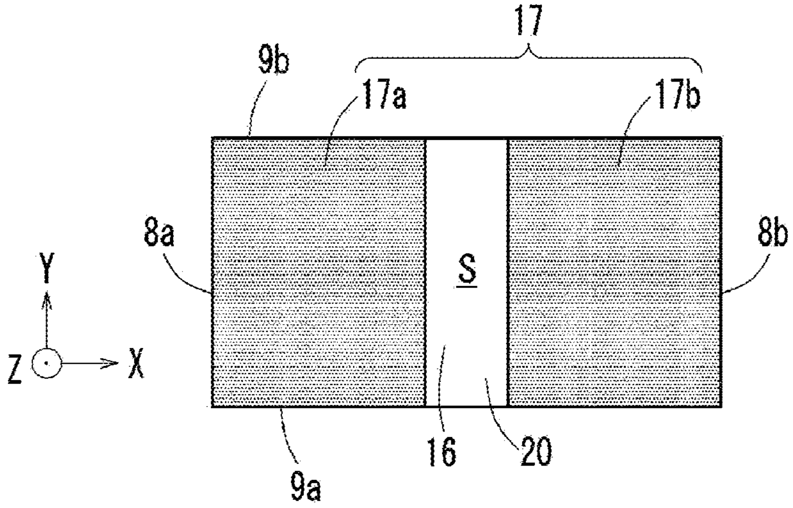
FIG. 5B is a plan view of a dummy electrode layer in the multilayer ceramic capacitor in FIG. 1, illustrating its example pattern.
Figure 5C:
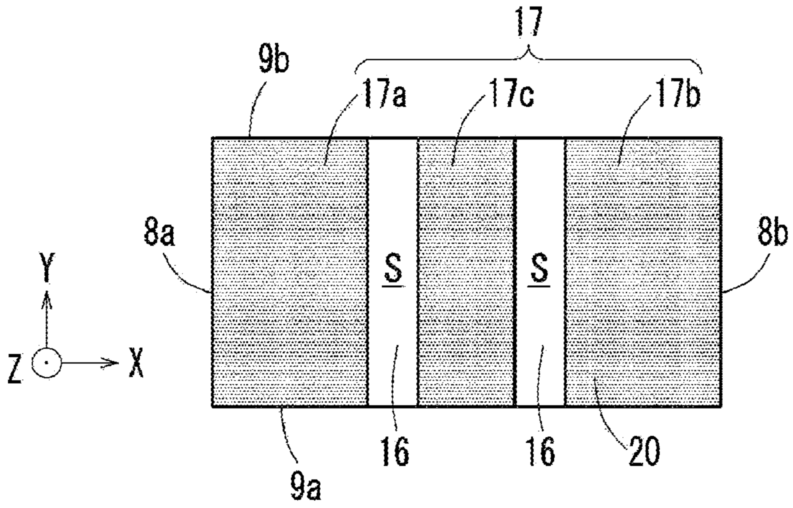
FIG. 5C is a plan view of a dummy electrode layer in the multilayer ceramic capacitor in FIG. 1, illustrating its example pattern.
Figure 6A:
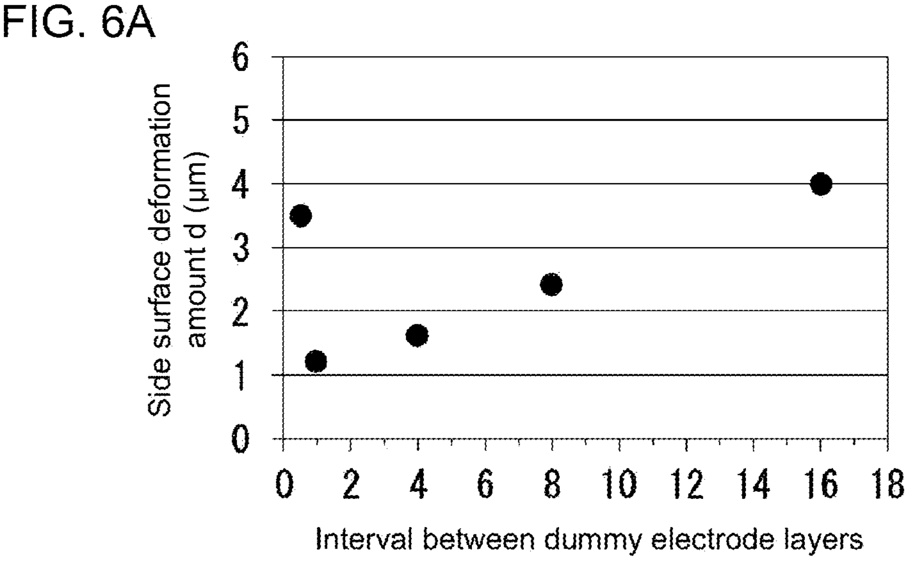
FIG. 6A is a graph showing the relationship between an interval between dummy electrode layers and a side surface deformation amount of the base component.
Figure 6B:
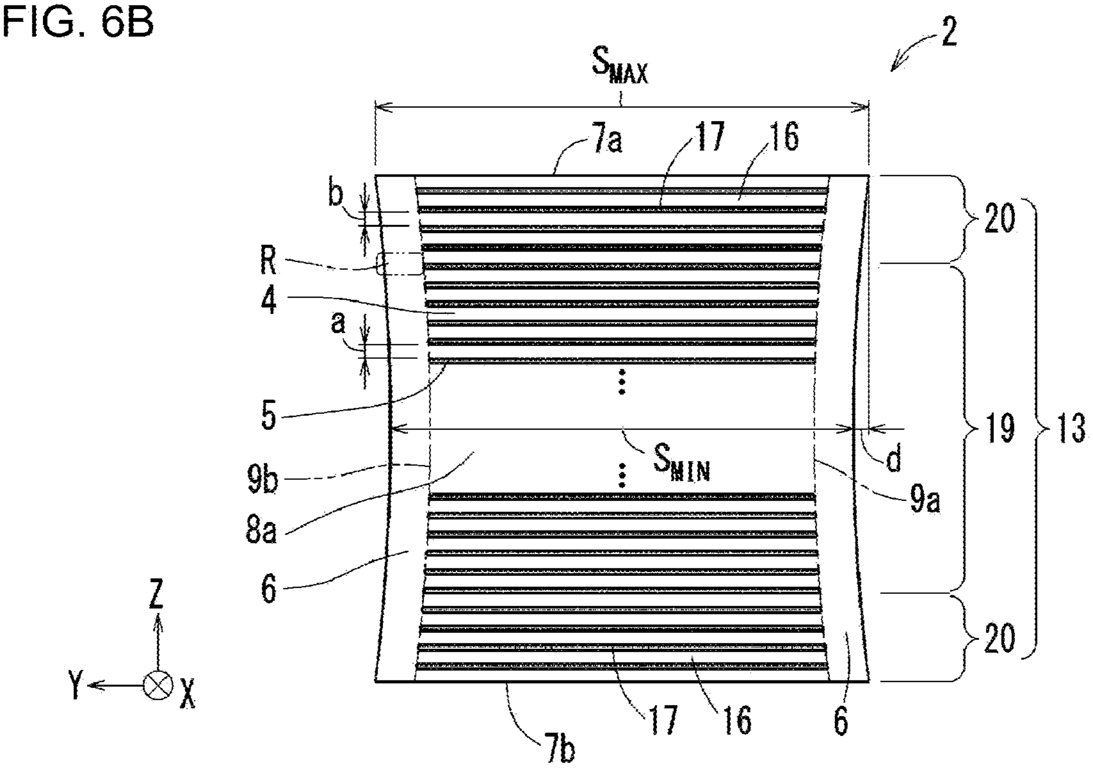
FIG. 6B is a diagram describing an example deformation of the base component and its side surface deformation amount.
Figure 6C:
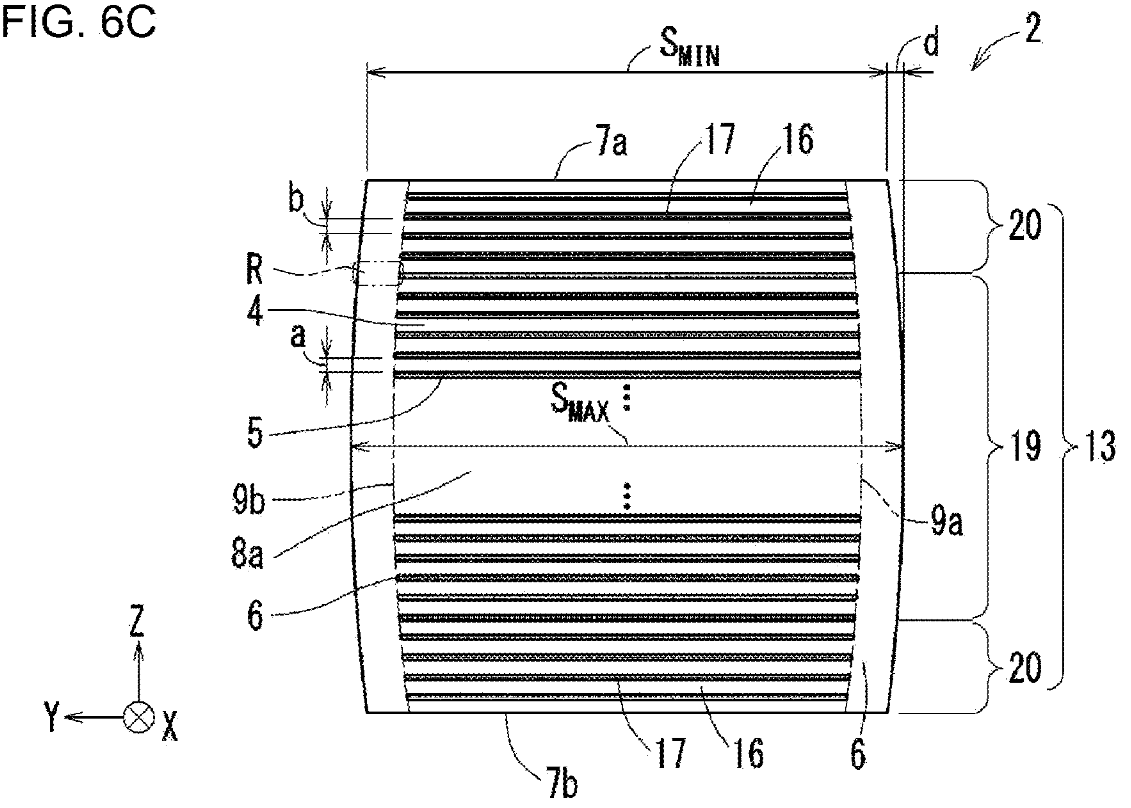
FIG. 6C is a diagram describing another example deformation of the base component and its side surface deformation amount.
Figure 7A:
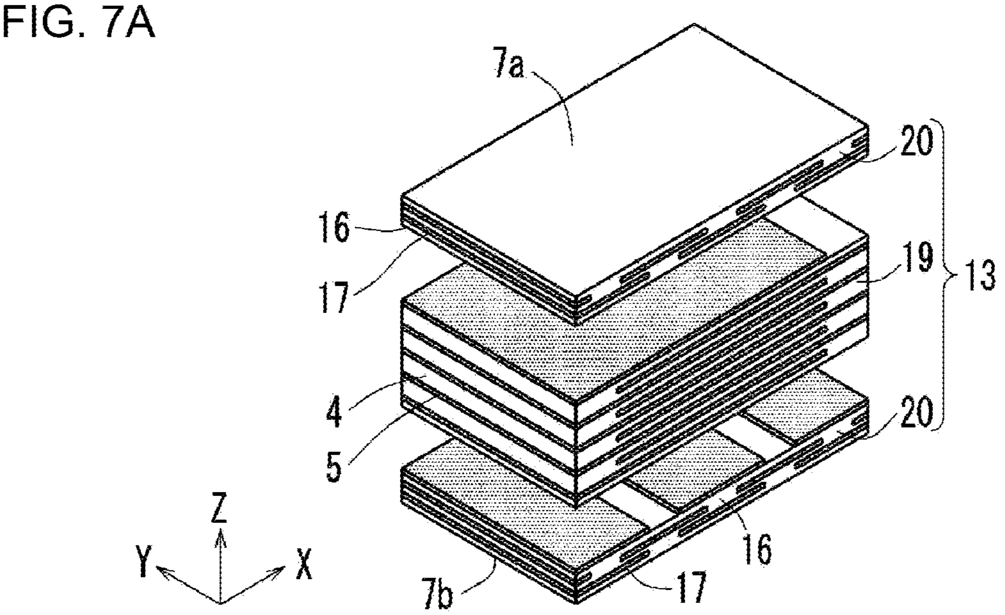
FIG. 7A is an exploded perspective view of an example stack in the multilayer ceramic capacitor in FIG. 1.
Figure 7B:
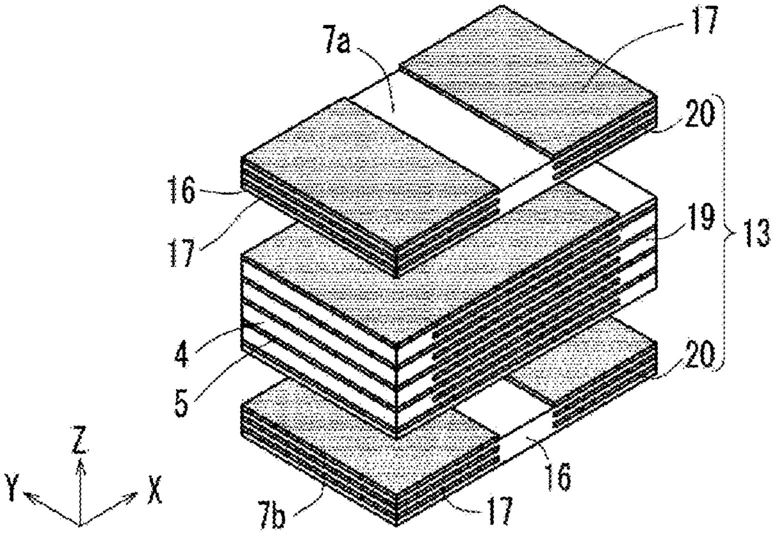
FIG. 7B is an exploded perspective view of an example stack in the multilayer ceramic capacitor in FIG. 1.
Figure 7C:
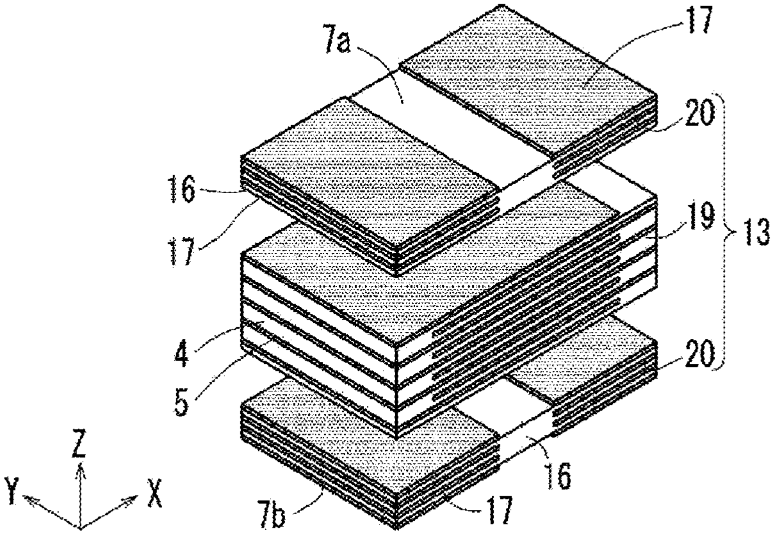
FIG. 7C is an exploded perspective view of an example stack in the multilayer ceramic capacitor in FIG. 1.

FIG. 1 is a perspective view of a multilayer ceramic capacitor according to an embodiment. FIG. 2 is a perspective view of a base component of the multilayer ceramic capacitor in FIG. 1. FIG. 3 is an exploded perspective view of the base component in FIG. 2. FIG. 4 is a side view of the base component in FIG. 3. FIGS. 5A, 5B, and 5C are each a plan view of a dummy electrode layer in the multilayer ceramic capacitor in FIG. 1, illustrating its example pattern. FIG. 6A is a graph showing the relationship between an interval between dummy electrode layers and a side surface deformation amount. FIG. 6B is a diagram describing an example deformation of a base precursor and its side surface deformation amount. FIG. 6C is a diagram describing another example deformation of the base precursor and its side surface deformation amount. FIGS. 6B and 6C are each a side view of the base component corresponding to the side view of FIG. 4. FIGS. 7A, 7B, and 7C are each an exploded perspective view of an example stack in the multilayer ceramic capacitor in FIG. 1.

In the present embodiment, as illustrated in FIG. 1, a multilayer ceramic capacitor 1 includes a base component 2 and external electrodes 3. As illustrated in FIGS. 2 and 3, the base component 2 includes a stack (also referred to as a base precursor) 13 and protective layers 6. The base component 2 shrinks through firing, but has the same structure as before firing. Thus, FIG. 2 is a diagram of the base component 2 before firing, as well as after firing.

As illustrated in FIG. 3, the stack 13 includes an active portion 19 and covers 20. As illustrated in FIG. 4, the active portion 19 includes multiple first dielectric layers 4 and multiple internal electrode layers 5 alternately stacked on one another. The first dielectric layers 4 and the internal electrode layers 5 are stacked in a predetermined direction (third direction). The internal electrode layers 5 may be stacked at a predetermined interval a in the third direction. The covers 20 are at two ends of the active portion 19 in the third direction. As illustrated in FIG. 4, each of the covers 20 includes multiple second dielectric layers 16 and multiple dummy electrode layers 17 alternately stacked on one another. The second dielectric layers 16 and the dummy electrode layers 17 are stacked in the third direction. The dummy electrode layers 17 may be stacked at a predetermined interval b in the third direction. The first dielectric layers 4 and the second dielectric layers 16 may be hereafter collectively referred to as dielectric layers 4 and 16. The internal electrode layers 5 and the dummy electrode layers 17 may be hereafter collectively referred to as electrode layers 5 and 17.

The stack 13 is substantially a rectangular prism (refer to FIGS. 2 and 3). The stack 13 includes a first surface 7*a* and a second surface 7*b* opposite to each other in the third direction, a first end face 8*a* and a second end face 8*b* opposite to each other in the first direction, and a first side surface 9*a* and a second side surface 9*b* opposite to each other in the second direction. The internal electrode layers 5 with one polarity are exposed on one of the first end face 8*a* or the second end face 8*b*, and the internal electrode layers 5 with the other polarity are exposed on the other of the first end face 8*a* or the second end face 8*b*. The internal electrode layers 5 are exposed on the first side surface 9*a* and the second side surface 9*b*. The first surface 7*a* and the second surface 7*b* may be perpendicular to the third direction. The first end face 8*a* and the second end face 8*b* may be perpendicular to the first direction. The first side surface 9*a* and the second side surface 9*b* may be perpendicular to the second direction. Hereafter, the first surface 7*a* and the second surface 7*b* may be collectively referred to as main surfaces 7*a* and 7*b*. The first end face 8*a* and the second end face 8*b* may be collectively referred to as end faces 8*a* and 8*b*. The first side surface 9*a* and the second side surface 9*b* may be collectively referred to as side surfaces 9*a* and 9*b*.

The first dielectric layers 4 are made of an insulating material. The first dielectric layers 4 may be made of a ceramic material containing, for example, $BaTiO_3$ (barium titanate), $CaTiO_3$ (calcium titanium), $SrTiO_3$ (strontium titanate), or $BaZrO_3$ (barium zirconate) as a main component. Note that the "main component" herein refers to a component with a highest composition ratio in a target material or a target member. The composition ratio may be a concentration (mol %).

The internal electrode layers 5 are made of a conductive material. The internal electrode layers 5 may be made of a metal material containing, for example, Ni (nickel), Pd (palladium), Ag (silver), or Cu (copper) as the main component.

The second dielectric layers 16 are made of an insulating material. The second dielectric layers 16 may be made of a ceramic material containing, for example, $BaTiO_3$, $CaTiO_3$, $SrTiO_3$, or $BaZrO_3$ as the main component. The second dielectric layers 16 contain the same main component as the first dielectric layers 4.

The dummy electrode layers 17 are made of a conductive material. The dummy electrode layers 17 may be made of a metal material containing, for example, Ni, Pd, Ag, or Cu as the main component. The dummy electrode layers 17 contain the same main component as the internal electrode layers 5. The dummy electrode layers 17 may have a pattern (or a shape as viewed in plan in a direction perpendicular to the main surfaces 7*a* and 7*b*) that does not cause short-circuiting between a first external electrode 3*a* and a second external electrode 3*b*. The pattern of the dummy electrode layers 17 may differ from a pattern of the internal electrode layers 5. In the present embodiment, the dummy electrode layers 17 have a pattern illustrated in FIG. 5B.

The external electrodes 3 include the first external electrode 3*a* and the second external electrode 3*b*. The first external electrode 3*a* extends from the first end face 8*a* to at least one of the first surface 7*a* or the second surface 7*b* (also referred to as an electrode-receiving surface). The first external electrode 3*a* is connected to the internal electrode layers 5 exposed on the first end face 8*a*. The second external electrode 3*b* extends from the second end face 8*b* to the electrode-receiving surface. The second external electrode 3*b* is connected to the internal electrode layers 5 exposed on the second end face 8*b*. When the dummy electrode layers 17 are exposed on the first end face 8*a*, the first external electrode 3*a* may be connected to the dummy electrode layers 17 exposed on the first end face 8*a*. When the dummy electrode layers 17 are exposed on the second end face 8*b*, the second external electrode 3*b* may be connected to the dummy electrode layers 17 exposed on the second end face 8*b*.

Each of the external electrodes 3 may include an underlayer connected to the stack 13, and a plating outer layer covering the underlayer. With the plating outer layer, each of the external electrodes 3 can be easily bonded to an external substrate or external wiring by soldering. The underlayer may be formed by applying a conductive paste for the external electrodes 3 to the base component 2 after firing and then baking the conductive paste. The underlayer may be formed by applying the conductive paste for the external electrodes 3 to the base component 2 before firing and then firing the base component 2 and the conductive paste together. The plating outer layer may be formed using a thin film deposition technique such as electroless plating or electroplating. Each of the underlayer and the plating outer layer may be single-layered or multilayered. Each of the external electrodes 3 may include no plating outer layer and may include the underlayer and a conductive resin layer. The underlayer may contain a metal such as Ni, Pd, Ag, or Cu or an alloy of these metals. The plating outer layer may contain a metal such as Ni, Sn (tin), or Cu or an alloy of these metals.

Each of the protective layers 6 is on the corresponding one of the first side surface 9*a* or the second side surface 9*b*. The protective layers 6 electrically insulate, from each other, the internal electrode layers 5 exposed on the side surfaces 9*a* and 9*b* and having different polarities. The protective layers 6 also physically protect ends of the internal electrode layers 5 exposed on the side surfaces 9*a* and 9*b*. Each of the protective layers 6 has a thickness less than or equal to 30 μm. Each of the protective layers 6 may have a thickness of 5 to 30 μm inclusive.

The protective layers 6 are made of an insulating material. The protective layers 6 may be made of a ceramic material. In this case, the protective layers 6 can be insulating and have relatively high mechanical strength. With the protective layers 6 made of a ceramic material, the stack 13 and the protective layers 6 can be fired together. The protective layers 6 may be made of a ceramic material containing, for example, $BaTiO_3$, $CaTiO_3$, $SrTiO_3$, or $BaZrO_3$ as the main component. The boundaries between the stack 13 and the protective layers 6 indicated by the two-dot-dash lines in FIG. 2 actually appear unclear.

When the protective layers 6 are thick, the firing shrinkage behavior of the protective layers 6 can greatly affect the firing shrinkage behavior of the active portion 19. To reduce the difference between the firing shrinkage behaviors of the protective layers 6 and the active portion 19, the protective layers 6 may be made of a ceramic material containing a component of the internal electrode layers 5 (e.g., the main component of the internal electrode layers 5). This allows a uniform firing shrinkage behavior across the entire base component 2. When the protective layers 6 are thin, the properties of the protective layers 6, such as electrical strength and physical strength, are more likely to deteriorate. In particular, the protective layers 6 containing a void or a conductive substance can have noticeable deterioration in their properties, possibly lowering the insulation resistance and the reliability. Thus, when each of the protective layers 6 has a thickness less than or equal to 15 μm, the protective layers 6 may be made of a ceramic material without containing a component of the internal electrode layers 5. This reduces the likelihood of lower insulation resistance and lower reliability when each of the protective layers 6 has a thickness less than or equal to 15 μm.

In the multilayer ceramic capacitor 1, each of the covers 20 includes the multiple second dielectric layers 16 and the multiple dummy electrode layers 17 alternately stacked on one another. The second dielectric layers 16 contain the same main component as the first dielectric layers 4. The dummy electrode layers 17 contain the same main component as the internal electrode layers 5. The second dielectric layers 16 and the dummy electrode layers 17 are stacked in the same direction as the first dielectric layers 4 and the internal electrode layers 5. This reduces a mismatch between the shrinkage behaviors of the active portion 19 and the covers 20 during firing of the base component 2. The protective layers 6 are thus less likely to crack when each of the protective layers 6 has a smaller thickness (less than or equal to 30 μm). The multilayer ceramic capacitor 1 can thus be small, have a large capacity, and be less likely to have lower reliability.

As illustrated in FIG. 5A, one of the dummy electrode layers 17 may be located in a middle portion of the cover 20 in the first direction and may not be in contact with the first external electrode 3*a* or the second external electrode 3*b*. This structure reduces short-circuiting between the first external electrode 3*a* and the second external electrode 3*b*. The dummy electrode layer 17 may extend from the first side surface 9*a* to the second side surface 9*b*. In other words, the dummy electrode layer 17 and each of the internal electrode layers 5 may have the same length in the second direction perpendicular to the first side surface 9*a*. The dummy electrode layer 17 may have a dimension in the first direction that is about a quarter to two-thirds of the dimension of the cover 20 in the first direction.

In the example in FIG. 5A, the dummy electrode layer 17 is located in the middle portion of the cover 20 in the first direction. However, the dummy electrode layer 17 may be located closer to the first end face 8*a* or closer to the second end face 8*b* than the middle portion. The cover 20 may include multiple dummy electrode layers 17 at different positions in the first direction. The stack 13 is obtained by cutting a multilayer base 11 (refer to FIGS. 10 and 11). The multilayer base 11 can be formed by pressing a multilayer base precursor in the stacking direction. The multilayer base precursor is a stack of ceramic green sheets (hereafter also simply referred to as green sheets) for the dielectric layers 4 and 16 on which the patterns of the electrode layers 5 and 17 are printed. With the cover 20 including multiple dummy electrode layers 17 at different positions in the first direction, the dielectric layers 4 and 16 can be bonded to the electrode layers 5 and 17 with higher adhesion when the multilayer base precursor is pressed into the multilayer base 11. This structure can also distribute internal distortions of the dielectric layers 4 and 16 and the electrode layers 5 and 17. This reduces the likelihood of lower reliability of the multilayer ceramic capacitor 1.

As illustrated in FIG. 5B, the dummy electrode layer 17 may include a first dummy electrode layer 17*a* and a second dummy electrode layer 17*b*. The first dummy electrode layer 17*a* extends from the first end face 8*a* toward the second end face 8*b*. The first dummy electrode layer 17*a* may be connected to the first external electrode 3*a*. The second dummy electrode layer 17*b* extends from the second end face 8*b* toward the first end face 8*a*. The second dummy electrode layer 17*b* may be connected to the second external electrode 3*b*. The first dummy electrode layer 17*a* and the second dummy electrode layer 17*b* are not in contact with each other, with a space S between the first dummy electrode layer 17*a* and the second dummy electrode layer 17*b*. The first dummy electrode layer 17*a* and the second dummy electrode layer 17*b* may extend from the first side surface 9*a* to the second side surface 9*b*. In other words, the first dummy electrode layer 17*a*, the second dummy electrode layer 17*b*, and the internal electrode layer 5 may have the same length in the second direction perpendicular to the first side surface 9*a*. In this case, the dummy electrode layer 17 overlaps corners of the main surfaces 7*a* and 7*b* as viewed in the direction perpendicular to the main surfaces 7*a* and 7*b*. With the dummy electrode layer 17 overlapping the corners of the main surfaces 7*a* and 7*b*, the dielectric layers 4 and 16 can be bonded to the electrode layers 5 and 17 with higher adhesion when the multilayer base precursor is pressed into the multilayer base 11. This structure can also distribute internal distortions of the dielectric layers 4 and 16 and the electrode layers 5 and 17. This reduces the likelihood of lower reliability of the multilayer ceramic capacitor 1. Each of the first dummy electrode layer 17*a* and the second dummy electrode layer 17*b* may have a dimension in the first direction that is about a quarter to one-third of the dimension of the cover 20 in the first direction.

As illustrated in FIG. 5C, the dummy electrode layer 17 may include the first dummy electrode layer 17*a*, the second dummy electrode layer 17*b*, and at least one third dummy electrode layer 17*c*. The first dummy electrode layer 17*a* extends from the first end face 8*a* toward the second end face 8*b*. The first dummy electrode layer 17*a* may be connected to the first external electrode 3*a*. The second dummy electrode layer 17*b* extends from the second end face 8*b* toward the first end face 8*a*. The second dummy electrode layer 17*b* may be connected to the second external electrode 3*b*. The first dummy electrode layer 17*a* and the second dummy electrode layer 17*b* are not in contact with each other. The third dummy electrode layer 17*c* is located between the first dummy electrode layer 17*a* and the second dummy electrode layer 17*b*. The third dummy electrode layer 17*c* is not in contact with the first dummy electrode layer 17*a* or the second dummy electrode layer 17*b*.

The first dummy electrode layer 17*a* and the second dummy electrode layer 17*b* may extend from the first side surface 9*a* to the second side surface 9*b*. In other words, the first dummy electrode layer 17*a*, the second dummy electrode layer 17*b*, and the internal electrode layer 5 may have the same length in the second direction perpendicular to the first side surface 9*a*. In this case, the dummy electrode layer 17 overlaps corners of the main surfaces 7*a* and 7*b* as viewed in the direction perpendicular to the main surfaces 7*a* and 7*b*. With the dummy electrode layer 17 overlapping the corners of the main surfaces 7*a* and 7*b*, the dielectric layers 4 and 16 can be bonded to the electrode layers 5 and 17 with higher adhesion when the multilayer base precursor is pressed into the multilayer base 11. This structure can also distribute internal distortions of the dielectric layers 4 and 16 and the electrode layers 5 and 17. This reduces the likelihood of lower reliability of the multilayer ceramic capacitor 1.

The third dummy electrode layer 17*c* may extend from the first side surface 9*a* to the second side surface 9*b*. In other words, the third dummy electrode layer 17*c* and the internal electrode layer 5 may have the same length in the second direction perpendicular to the first side surface 9*a*. With the first dummy electrode layer 17*a*, the second dummy electrode layer 17*b*, and the third dummy electrode layer 17*c* extending from the first side surface 9*a* to the second side surface 9*b*, the dielectric layers 4 and 16 can be bonded to the electrode layers 5 and 17 with still higher adhesion when the multilayer base precursor is pressed into the multilayer base 11. This structure can also further distribute internal distortions of the dielectric layers 4 and 16 and the electrode layers 5 and 17. This further reduces the likelihood of lower reliability of the multilayer ceramic capacitor 1. Each of the first dummy electrode layer 17*a* and the second dummy electrode layer 17*b* may have a dimension in the first direction that is about a quarter to one-third of the dimension of the cover 20 in the first direction. The third dummy electrode layer 17*c* may have a dimension in the first direction that is about a quarter to a half of the dimension of the cover 20 in the first direction.

The dummy electrode layer 17 illustrated in FIG. 5B includes the single space S between the first dummy electrode layer 17*a* and the second dummy electrode layer 17*b*. The dummy electrode layer 17 illustrated in FIG. 5C includes two spaces S. The increased number of spaces S reduces the likelihood of short-circuiting between the first dummy electrode layer 17*a* and the second dummy electrode layer 17*b*. The third dummy electrode layer 17*c* may be multiple third dummy electrode layers 17*c* that are not in contact with one another. Such a structure can include three or more spaces S between the first dummy electrode layer 17*a* and the second dummy electrode layer 17*b*, and can thus further reduce the likelihood of short-circuiting between the first dummy electrode layer 17*a* and the second dummy electrode layer 17*b*. The cover 20 may include the dummy electrode layer 17 illustrated in FIG. 5B and the dummy electrode layer 17 illustrated in FIG. 5C that are alternately stacked on one another, with one of the second dielectric layers 16 located between the dummy electrode layer 17 illustrated in FIG. 5B and the dummy electrode layer 17 illustrated in FIG. 5C. With the dummy electrode layers 17 with the different patterns alternately stacked, the internal stress can be distributed in a process of pressing the multilayer base precursor.

The effects of the covers 20 including the dummy electrode layers 17 will now be described with reference to FIGS. 6A, 6B, and 6C. FIG. 6A is a graph showing the relationship between the interval b between the dummy electrode layers 17 and a side surface deformation amount d of the base component 2. FIGS. 6B and 6C are each a diagram describing a deformation of the base component 2 and the side surface deformation amount d of the base component 2. The relationship shown in the graph in FIG. 6A is obtained by preparing samples of the base component 2 and measuring the dimensions of the prepared samples. The horizontal axis of the graph in FIG. 6A indicates "the interval between dummy electrode layers" that is expressed as a ratio b/a of the interval b between the dummy electrode layers 17 to the interval a between the internal electrode layers 5. To prepare the samples of the base component 2, a single green sheet or stacked green sheets for the first dielectric layers 4 (hereafter also referred to as a dielectric-layer green sheet or dielectric-layer green sheets) are used as a green sheet for each of the second dielectric layers 16. This allows the ratio b/a to be a natural number, as in the samples corresponding to the first to fourth data points from the right end of the graph in FIG. 6A. The horizontal axis of the graph in FIG. 6A may also be referred to as indicating the number of green sheets for the first dielectric layers 4 included in each of the green sheets for the second dielectric layers 16. The green sheets for the second dielectric layers 16 may be thinner than the dielectric-layer green sheets. This allows the ratio b/a to be less than 1, as in the sample corresponding to the data point at the left end of the graph in FIG. 6A. The vertical axis of the graph in FIG. 6A indicates the side surface deformation amount d of the fired base component 2. As illustrated in FIGS. 6B and 6C, the side surface deformation amount d is half the difference between a maximum dimension $S_{MAX}$ and a minimum dimension $S_{MIN}$ between the side surfaces 9*a* and 9*b* of the fired base component 2. The side surface deformation amount d being smaller can indicate a reduced mismatch between the shrinkage behaviors of the active portion 19 and the covers 20.

Note that, the samples (base components 2) used to obtain the results shown in FIG. 6A are prepared using the dielectric-layer green sheets each with a thickness of 1.0 μm. Each of the base components 2 has a length of 1.0 mm, and a width and a height of 0.5 mm. Each of the printed internal electrode layers 5 has a thickness of 0.8 μm. Each of the dummy electrode layers 17 may be as thick as or thicker than each of the internal electrode layers 5. The dummy electrode layers 17 that are too thick may cause steps to be formed on the main surfaces 7*a* and 7*b* of the stack 13. This may cause cracks with internal distortions during firing. To obtain the results shown in FIG. 6A, the dummy electrode layers 17 are adjusted to have a thickness that does not cause cracks. For example, each of the dummy electrode layers 17 may have a thickness about 1.5 to 2.5 times inclusive the thickness of each of the internal electrode layers 5.

The number of dummy electrode layers 17 in the covers 20 can be closer to the number of internal electrode layers 5 in the active portion 19. This reduces the difference between the firing shrinkage behaviors of the covers 20 and the active portion 19. However, the covers 20 do not contribute to the capacitance of the multilayer ceramic capacitor 1. Increasing the number of dummy electrode layers 17 in the covers 20 may increase the cost of the multilayer ceramic capacitor 1. Thus, the number of dummy electrode layers 17 may be within a range that allows the performance of the multilayer ceramic capacitor 1 to be less susceptible to the side surface deformation amount d.

As illustrated in, for example, FIG. 6B, the fired base component 2 may extend farther in the width direction at two ends than at the center in the height direction (Z-direction). In this case, the maximum dimension $S_{MAX}$ may be the dimension between the side surfaces 9*a* and 9*b* at the upper end or the lower end of the base component 2 in the height direction. The minimum dimension $S_{MIN}$ may be the dimension between the side surfaces 9*a* and 9*b* at the center of the base component 2 in the height direction. As illustrated in, for example, FIG. 6C, the fired base component 2 may extend farther in the width direction at the center than at the two ends in the height direction. In this case, the maximum dimension $S_{MAX}$ may be the dimension between the side surfaces 9*a* and 9*b* at the center of the base component 2 in the height direction. The minimum dimension $S_{MIN}$ may be the dimension between the side surfaces 9*a* and 9*b* at the upper end or the lower end of the base component 2 in the height direction.

When each of the covers 20 includes one or more dielectric-layer green sheets alone, the base component 2 is more likely to have a mismatch between the shrinkage behaviors of the active portion 19 and the covers 20 during firing. More specifically, the active portion 19 includes, for example, the fired first dielectric layers 4 each with a thickness of about 0.4 to several micrometers and the fired internal electrode layers 5 each with a thickness of about 0.4 to 2 μm. The total number of the stacked layers is about several hundred to one thousand. The active portion 19 thus tends to shrink to a greater degree during firing than the covers 20 including the dielectric-layer green sheets alone and without including electrode layers. Thus, each of the protective layers 6 is more likely to crack in an area R (refer to FIGS. 6B and 6C) extending between the active portion 19 and the corresponding cover 20.

When the covers 20 on an upper surface and a lower surface of the active portion 19 were each formed with 34 dielectric-layer green sheets alone stacked on one another, the side surface deformation amount d of the fired base component 2 was 5.1 μm. In contrast, when each of the covers 20 was formed with five dummy electrode layers 17 at an interval 16 times the interval between the internal electrode layers 5, the side surface deformation amount d was 4.0 μm as shown in FIG. 6A. In the same or similar manner, when each of the covers 20 was formed with five dummy electrode layers 17 at an interval eight times the interval between the internal electrode layers 5, the side surface deformation amount d was 2.4 μm. In the same or similar manner, when each of the covers 20 was formed with five dummy electrode layers 17 at an interval four times the interval between the internal electrode layers 5, the side surface deformation amount d was 1.6 μm. In the same or similar manner, when each of the covers 20 was formed with five dummy electrode layers 17 at an interval one times the interval between the internal electrode layers 5, the side surface deformation amount d was 1.2 μm. Note that, when the interval b between the dummy electrode layers 17 is one or more times the interval a between the internal electrode layers 5, the fired base component 2 may have the shape illustrated in FIG. 6B.

When a single dielectric-layer green sheet or stacked dielectric-layer green sheets are used as the green sheet for each of the second dielectric layers 16, the interval b between the dummy electrode layers 17 is limited to a natural number multiple of the interval a between the internal electrode layers 5. As described above, the green sheets for the second dielectric layers 16 may be thinner than the dielectric-layer green sheets. This allows the interval b between the dummy electrode layers 17 to be smaller than the interval a between the internal electrode layers 5. When each of the covers 20 was formed with five dummy electrode layers 17 at an interval 0.5 times the interval between the internal electrode layers 5, the side surface deformation amount d was 3.5 μm as shown in FIG. 6A. Note that, when the interval b between the dummy electrode layers 17 is smaller than the interval a between the internal electrode layers 5, the fired base component 2 may have the shape illustrated in FIG. 6C.

As described above, when the interval b between the dummy electrode layers 17 is one to eight times inclusive the interval a between the internal electrode layers 5, the side surface deformation amount d is less than or equal to 3.0 μm. This effectively reduces cracks in the protective layers 6. Note that, although the increase or decrease in the number of dummy electrode layers 17 changed the value of the side surface deformation amount d, the results had a trend similar to the trend shown in FIG. 6A. In other words, the number of dummy electrode layers 17 may be increased or decreased from five. In this case as well, the protective layers 6 can effectively reduce cracks when the interval b between the dummy electrode layers 17 is one to eight times inclusive the interval a between the internal electrode layers 5. Note that each of the dummy electrode layers 17 may have any of the shapes and arrangements illustrated in FIGS. 5A to 5C. With any of these shapes and arrangements, the protective layers 6 can effectively reduce cracks when the interval b between the dummy electrode layers 17 is one to eight times inclusive the interval a between the internal electrode layers 5.

When a single dielectric-layer green sheet or stacked dielectric-layer green sheets are used as the green sheet for each of the second dielectric layers 16, the interval b between the dummy electrode layers 17 is a natural number multiple of the interval a between the internal electrode layers 5. The green sheet for each of the second dielectric layers 16 may be a single green sheet or stacked green sheets each with a thickness different from the thickness of the dielectric-layer green sheets. This allows the interval b between the dummy electrode layers 17 to be r times (r is an actual number greater than 1) the interval a between the internal electrode layers 5. The ratio b/a may also be a non-integer. In this case as well, the side surface deformation amount d can be less than or equal to 3.0 μm when the interval b between the dummy electrode layers 17 is one to eight times inclusive the interval a between the internal electrode layers 5. This effectively reduces cracks in the protective layers 6.

Each of the dielectric-layer green sheets may have a thickness of, for example, about 1.0 to 5.0 μm. When the dielectric-layer green sheets are thinner, the active portion 19 can include more layers, causing a greater difference in the firing shrinkage between the active portion 19 and the covers 20. The conditions for the interval b determined based on the base component 2 including thin dielectric-layer green sheets can also be applied to the base component 2 including thick dielectric-layer green sheets.

As illustrated in FIG. 7A, the stack 13 may include the covers 20 each including the multiple dummy electrode layers 17 with the pattern illustrated in FIG. 5C stacked on one another, with one of the second dielectric layers 16 located between adjacent dummy electrode layers 17. As illustrated in FIG. 7A, each of the covers 20 may include the multiple dummy electrode layers 17 stacked on one another in a manner shifted from one another in the first direction. This structure allows internal stress to be distributed in the process of pressing the multilayer base precursor, increasing the reliability of the multilayer ceramic capacitor 1.

As illustrated in FIG. 7B, the stack 13 may include the covers 20 each including a predetermined number of stacked second dielectric layers 16 with the dummy electrode layers 17 having the pattern illustrated in FIG. 5B. In the stack 13, as illustrated in FIG. 7B, one of the dummy electrode layers 17 may define the upper surface of the cover 20 located on the upper surface of the active portion 19. In this structure, the external electrodes 3 can be firmly bonded to the stack 13 to extend from the end faces 8*a* and 8*b* to the first surface 7*a* of the stack 13. This increases the reliability of the multilayer ceramic capacitor 1.

As illustrated in FIG. 7C, the stack 13 may include the covers 20 each including a predetermined number of stacked second dielectric layers 16 with the dummy electrode layers 17 illustrated in FIG. 5B. In the stack 13, as illustrated in FIG. 7C, one of the dummy electrode layers 17 may define the upper surface of the cover 20 located on the upper surface of the active portion 19. One of the dummy electrode layers 17 may define the lower surface of the cover 20 located on the lower surface of the active portion 19. In this structure, the external electrodes 3 can be firmly bonded to the stack 13 to extend from the end faces 8*a* and 8*b* to the first surface 7*a* and the second surface 7*b* of the stack 13. This increases the reliability of the multilayer ceramic capacitor 1. The base component 2 can also be handled without distinguishing the top and bottom of the base component 2, allowing efficient manufacture of the multilayer ceramic capacitor 1.

The dummy electrode layers 17 have the same main component as the internal electrode layers 5. This reduces the difference between the shrinkage behaviors of the covers 20 and the active portion 19. The components other than the main component of the dummy electrode layers 17 can be adjusted for other purposes. For example, when the dummy electrode layers 17 are made of a metal material containing Ni, Pd, Ag, or Cu as the main component, the dummy electrode layers 17 may not be easily bonded to the second dielectric layers 16 during firing of the base component 2. When one of the dummy electrode layers 17 defines at least one of the upper surface or the lower surface of the corresponding cover 20 as illustrated in FIGS. 7B and 7C, a conductive paste for the dummy electrode layers 17 may contain a ceramic powder. This allows sintering of the ceramic powder in the conductive paste for the dummy electrode layers 17 and the ceramic powder in the dielectric-layer sheets for the second dielectric layers 16 during firing of the base component 2. Thus, the dummy electrode layers 17 can firmly adhere to the second dielectric layers 16. This reduces separation of the dummy electrode layers 17 from the second dielectric layers 16.

Figure 8A:
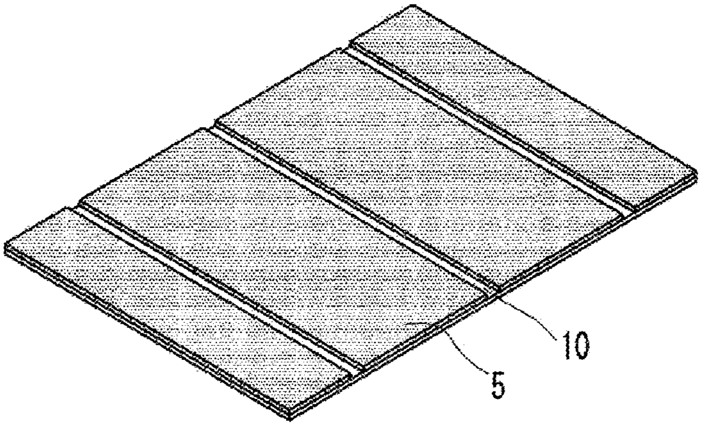
FIG. 8A is a perspective view of a ceramic green sheet on which a conductive paste for an internal electrode layer is printed.
Figure 8B:
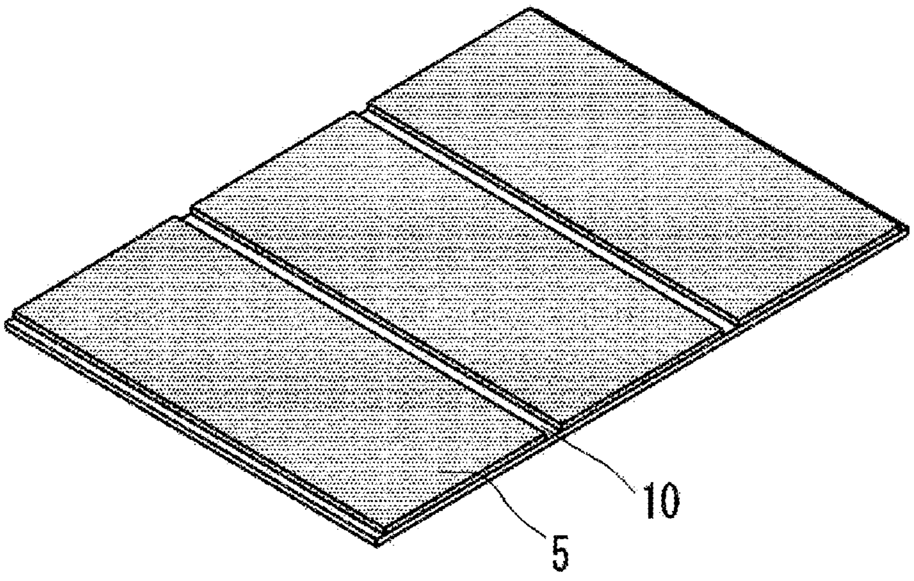
FIG. 8B is a perspective view of a ceramic green sheet on which a conductive paste for an internal electrode layer is printed.
Figure 8C:
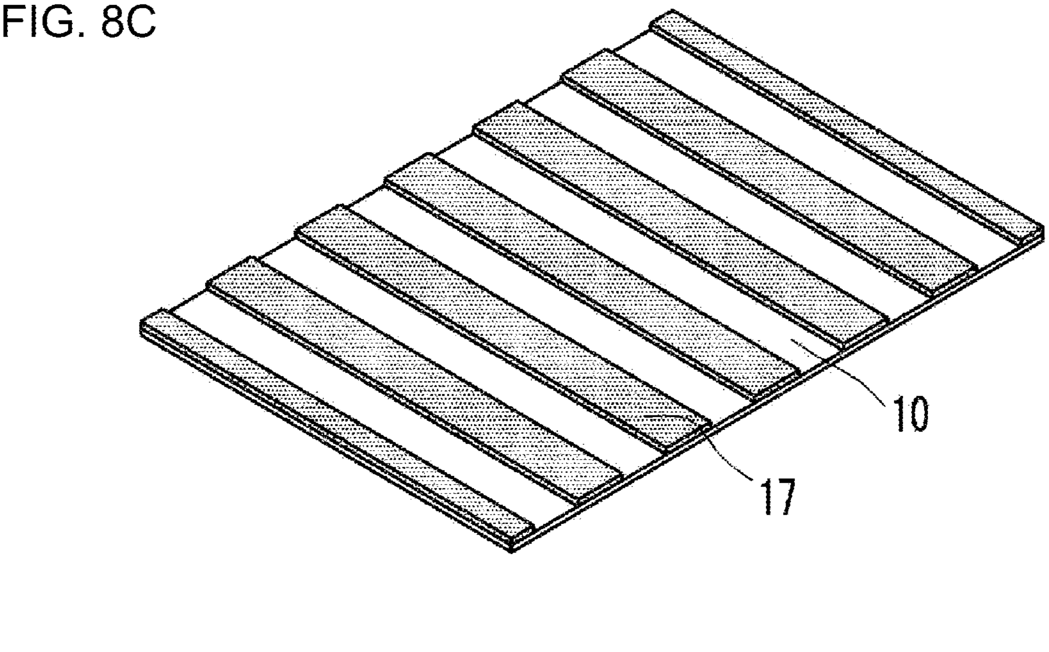
FIG. 8C is a perspective view of a ceramic green sheet on which a conductive paste for the dummy electrode layer is printed.
Figure 9:
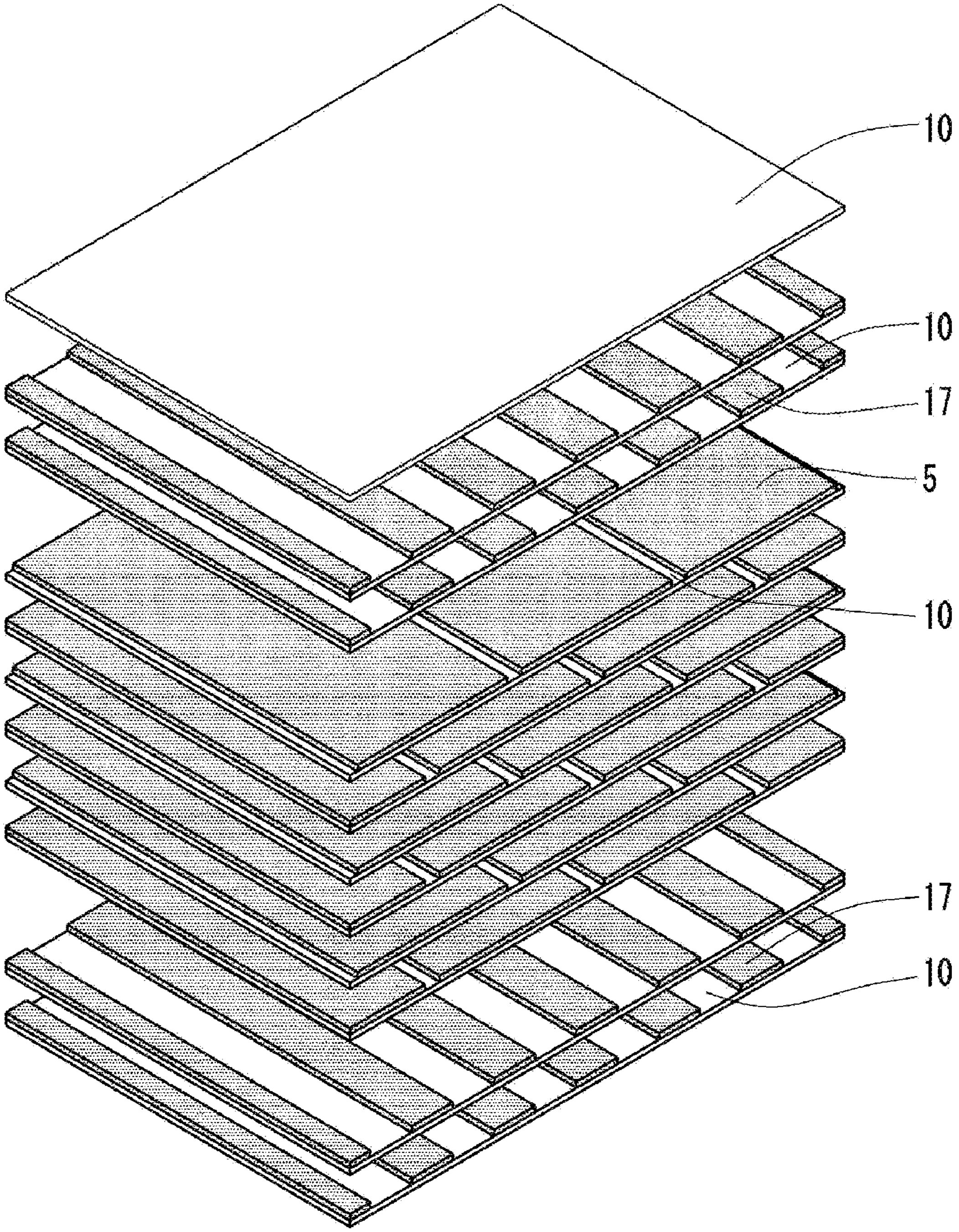
FIG. 9 is a perspective view of the ceramic green sheets in FIGS. 8A, 8B, and 8C stacked on one another.

A method for manufacturing the multilayer ceramic capacitor 1 will now be described. FIGS. 8A and 8B are each a perspective view of a ceramic green sheet on which a conductive paste for an internal electrode layer is printed. FIG. 8C is a perspective view of a ceramic green sheet on which a conductive paste for the dummy electrode layer is printed. FIG. 9 is a perspective view of the ceramic green sheets in FIGS. 8A, 8B, and 8C stacked on one another. FIG.

Figure 11:
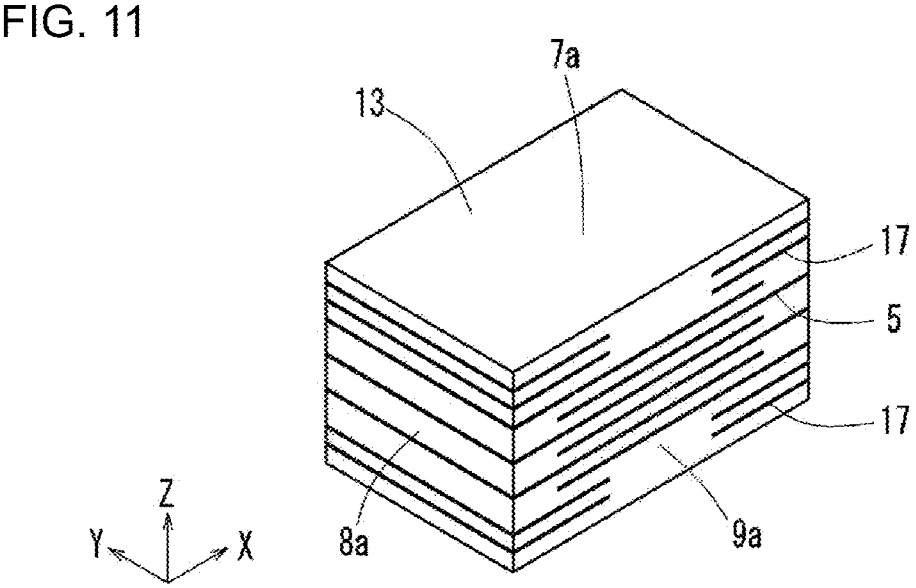
FIG. 11 is a perspective view of a base precursor.
Figure 12:
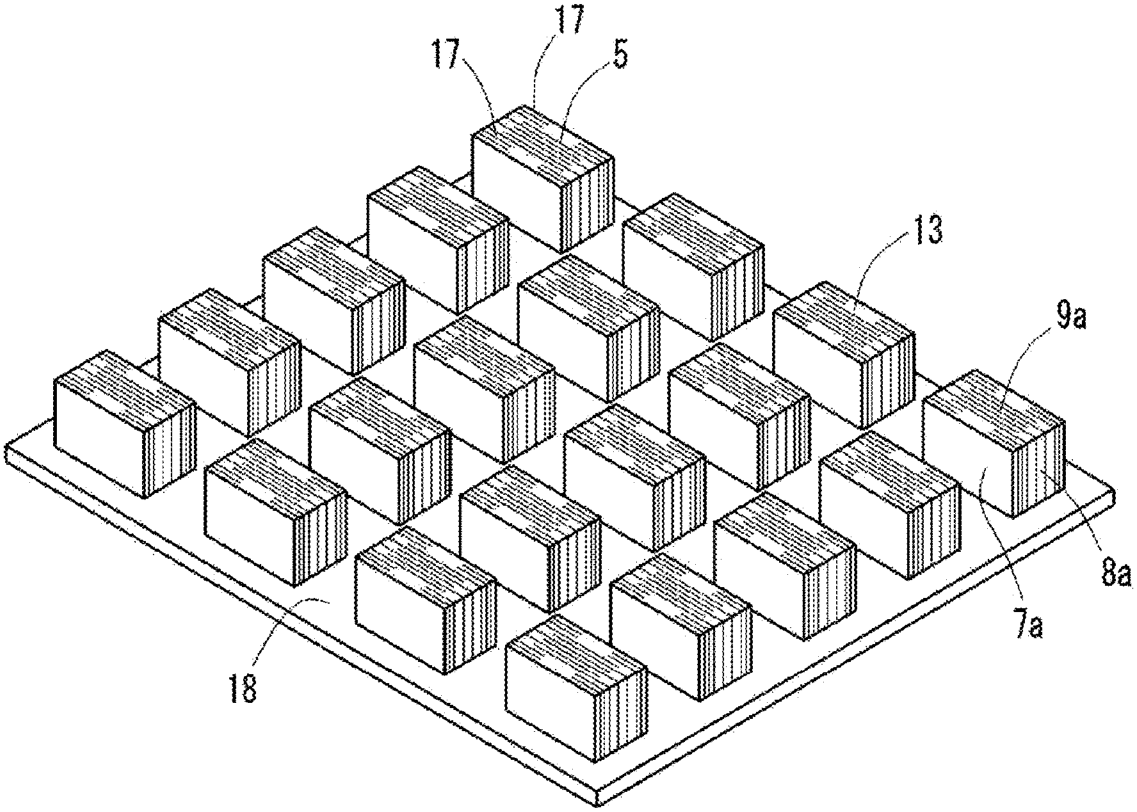
FIG. 12 is a perspective view of multiple base precursors arranged on a support sheet.
Figure 13A:
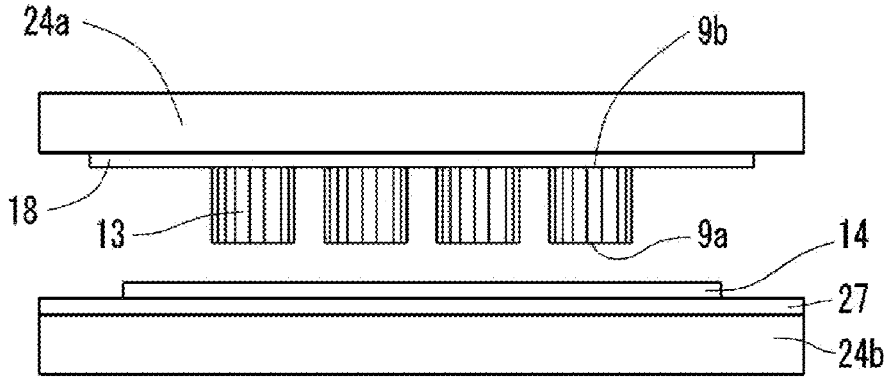
FIG. 13A is a diagram describing a process of forming protective layers on side surfaces of the base precursors.
Figure 13B:
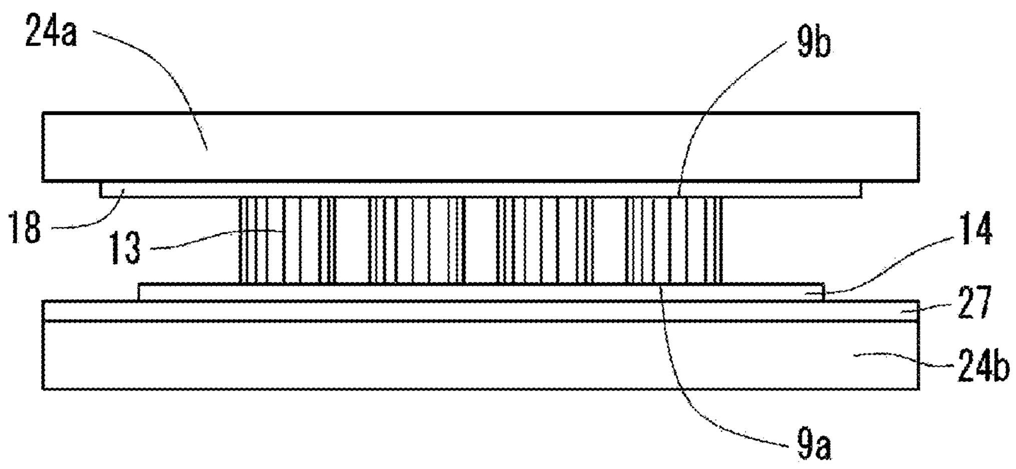
FIG. 13B is a diagram describing the process of forming the protective layers on the side surfaces of the base precursors.
Figure 13C:
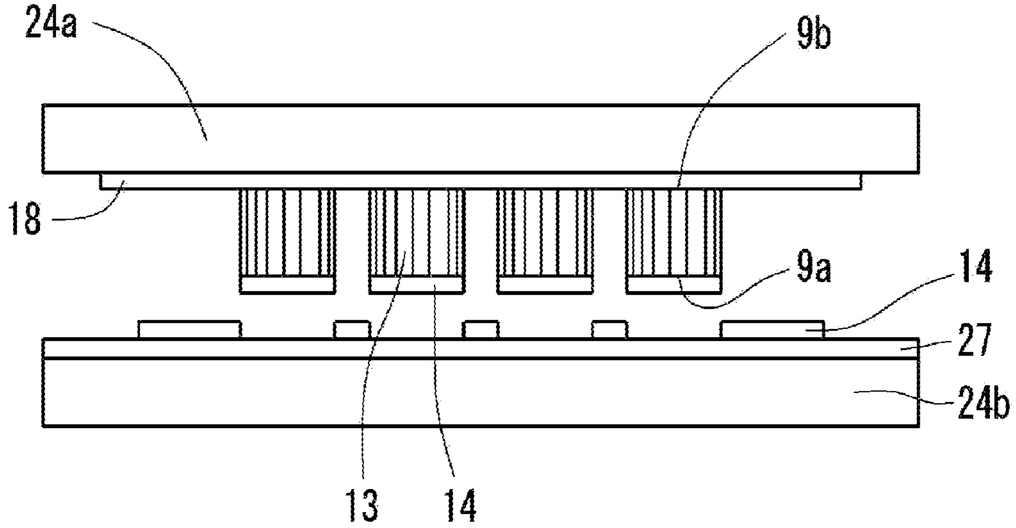
FIG. 13C is a diagram describing the process of forming the protective layers on the side surfaces of the base precursors.
Figure 14:
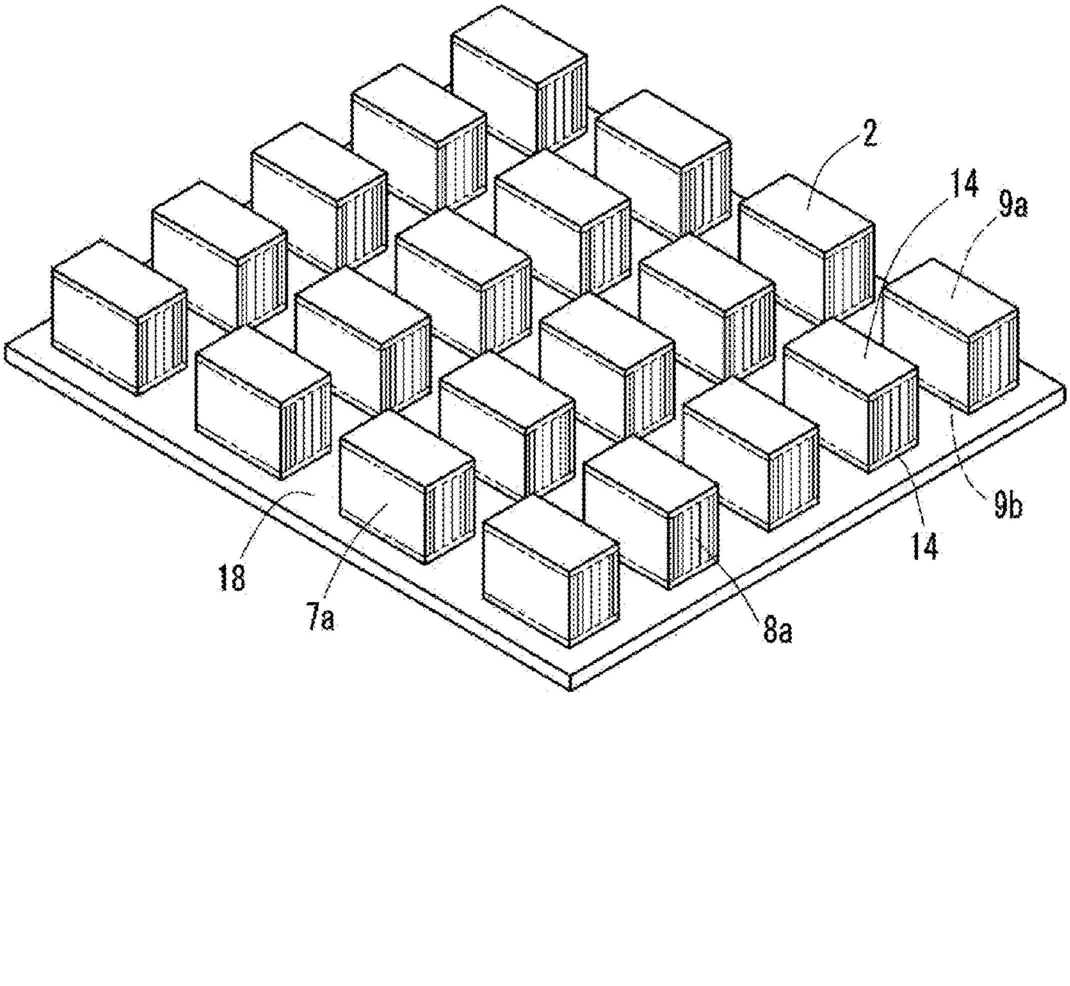
FIG. 14 is a perspective view of multiple base components on which the protective layers are formed.

10 is a perspective view of a multilayer base. FIG. 11 is a perspective view of a base precursor. FIG. 12 is a perspective view of multiple base precursors arranged on a support sheet. FIGS. 13A, 13B, and 13C are each a diagram describing a process of forming the protective layers on the side surfaces of the base precursors. FIG. 14 is a perspective view of multiple base components arranged on the support sheet.

A ceramic mixture powder containing an additive and $BaTiO_3$ as a ceramic dielectric material is first wet-ground and mixed using a bead mill and then mixed with a polyvinyl butyral binder, a plasticizer, and an organic solvent to obtain ceramic slurry.

A die coater is then used to shape a ceramic green sheet (hereafter also simply referred to as a green sheet) 10 on a carrier film. The green sheet 10 may have a thickness of, for example, about 1 to 10 μm. The green sheet 10 with a smaller thickness can increase the capacitance of the multilayer ceramic capacitor 1. The green sheet 10 may be shaped with, for example, a doctor blade coater or a gravure coater, rather than with the die coater.

The green sheet 10 for each of the second dielectric layers 16 may contain the same main component as the green sheet 10 for each of the first dielectric layers 4. The green sheet 10 for each of the second dielectric layers 16 may be a single green sheet 10 or stacked green sheets 10 for the first dielectric layers 4. The green sheet 10 for each of the second dielectric layers 16 may have a thickness eight times or less the thickness of the green sheet 10 for each of the first dielectric layers 4.

The conductive paste for the internal electrode layers 5 is then printed on the green sheets 10 for the first dielectric layers 4 by screen printing in the patterns illustrated in FIGS. 8A and 8B. The conductive paste for the dummy electrode layers 17 is printed on the green sheets 10 for the second dielectric layers 16 in the pattern illustrated in FIG. 8C. FIGS. 8A and 8B each illustrate one of the internal electrode layers 5 printed on the green sheets 10 for the first dielectric layers 4 included in the active portion 19. The internal electrode layers 5 have the pattern illustrated in FIG. 8A and the pattern illustrated in FIG. 8B. The pattern illustrated in FIG. 8B may be formed by shifting the position of the pattern illustrated in FIG. 8A. FIG. 8C illustrates one of the dummy electrode layers 17 printed on the green sheets 10 for the second dielectric layers 16 included in the covers 20. The dummy electrode layer 17 is printed in a strip pattern. The conductive paste for the internal electrode layers 5 and the conductive paste for the dummy electrode layers 17 may each contain Ni as the main component. The conductive paste for the internal electrode layers 5 and the conductive paste for the dummy electrode layers 17 may each contain, in addition to Ni as the main component, a metal such as Pd, Cu, or Ag or an alloy of these metals. The conductive paste for the internal electrode layers 5 is hereafter also simply referred to as the internal electrode layers 5. The conductive paste for the dummy electrode layers 17 is also simply referred to as the dummy electrode layers 17.

The internal electrode layers 5 and the dummy electrode layers 17 may be printed by, for example, gravure printing, rather than by screen printing.

Each of the internal electrode layers 5 may have a thickness about, for example, less than or equal to 1.0 μm. This can reduce internal defects such as cracks caused by internal stress in the multilayer ceramic capacitor 1 including many layers.

FIG. 9 is a perspective view of the stacked green sheets 10 on which the electrode layers 5 and 17 are printed. First, a predetermined number of green sheets 10 for the second dielectric layers 16 with the printed dummy electrode layers 17 are stacked. A predetermined number of green sheets 10 for the first dielectric layers 4 with the printed internal electrode layers 5 are then alternately stacked. A predetermined number of green sheets 10 for the second dielectric layers 16 with the printed dummy electrode layer 17 are further stacked. The predetermined number of green sheets 10 for the first dielectric layers 4 with the printed internal electrode layers 5 may be stacked on one another with the positions of the patterns of the internal electrode layers 5 being shifted from one another. The green sheets 10 with the printed electrode layers 5 and 17 are stacked on the support sheet (not illustrated). The support sheet may be an adhesive releasable sheet, such as a low-tack sheet or a foam releasable sheet.

Figure 10:
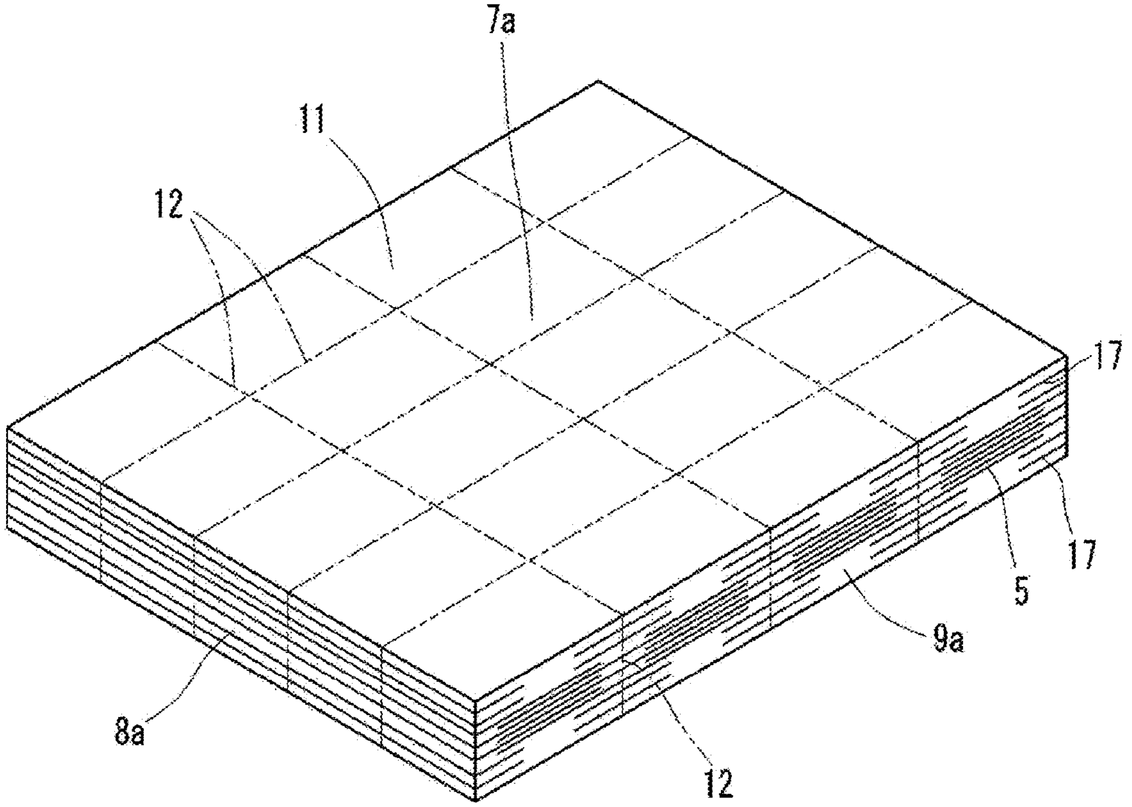
FIG. 10 is a perspective view of a multilayer base.

The multilayer base precursor, which is a stack of the green sheets 10 with the printed electrode layers 5 and 17, is then pressed in the stacking direction to obtain the multilayer base 11 illustrated in FIG. 10. The multilayer base precursor may be pressed using, for example, a hydrostatic press device. In the multilayer base 11, the electrode layers 5 and 17 are buried in layers between the green sheets 10. Note that, although not illustrated in FIG. 10, the support sheet, which is used in stacking the ceramic green sheets 10, is located under the multilayer base 11. The broken lines in FIG. 10 are cutting lines 12 indicating the positions for cutting the multilayer base 11.

Subsequently, the multilayer base 11 is cut along the cutting lines 12 using a press-cutting device to obtain the base precursors (stacks) 13, one of which is illustrated in FIG. 11. Note that the multilayer base 11 may be cut with any device other than the press-cutting device. For example, a dicing saw may be used. The main surfaces, the end faces, and the side surfaces of the multilayer base 11, corresponding respectively to the main surfaces 7*a* and 7*b*, the end faces 8*a* and 8*b*, and the side surfaces 9*a* and 9*b* of the base precursor 13, are hereafter denoted with the same reference signs.

A tray (not illustrated) is then prepared. The tray includes multiple pockets arranged in rows and columns to individually receive the multiple base precursors 13. The multiple base precursors 13 are placed in the respective pockets, with the cut surfaces (second side surfaces 9*b*) of the base precursors 13 facing upward. An adhesive and releasable support sheet 18 is then placed over the cut surfaces of the multiple base precursors 13 to fix the base precursors 13 to the support sheet 18. The tray is then removed.

FIG. 12 illustrates the multiple base precursors 13 fixed on the support sheet 18. The base precursors 13 are arranged in the same orientation with the cut surfaces (first side surfaces 9*a*) being open. In the state illustrated in FIG. 12, the cut surfaces may be cleaned to remove foreign matter adhering to the cut surfaces before a green sheet for the protective layers 6 is bonded to the cut surfaces. Examples of the foreign matter adhering to the cut surfaces include fragments of the green sheets 10, a resin binder contained in the green sheets 10, and glue on the support sheet 18. The cut surfaces may be cleaned by, for example, blasting or laser beam machining.

A process of bonding a ceramic green sheet (hereafter also simply referred to as a green sheet) 14 for the protective layers 6 to the cut surfaces of the base precursors 13 will now be described with reference to FIGS. 13A, 13B, and 13C. First, the green sheet 14 formed on a resin sheet 27 is placed on an elastic sheet 24*b* as illustrated in FIG. 13A. The resin sheet 27 may be, for example, a smooth sheet of polyethylene terephthalate (PET) or polypropylene (PP)

with a thickness of about 10 to 40 μm. The resin sheet 27 may be flexible. A mold release agent may be applied to the surface of the resin sheet 27 opposite to the surface facing the elastic sheet 24*b* to facilitate removal of the green sheet 14 from the resin sheet 27. The multiple base precursors 13 fixed on the support sheet 18 are positioned with the cut surfaces (first side surfaces 9*a*) facing the green sheet 14. The support sheet 18 may be placed on an elastic sheet 24*a*.

The green sheet 14 for the protective layers 6 has a predetermined thickness to be easily bonded to the base precursors 13. The green sheet 14 may have a thickness of, for example, 5 to 30 μm. The green sheet 14 may contain the same main component as the green sheets 10 for the first dielectric layers 4. The protective layers 6 are thus less likely to affect the properties of the multilayer ceramic capacitor 1. The green sheet 14 for the protective layers 6 may have the same composition as the green sheets 10 for the first dielectric layers 4. Note that the green sheet 14 contains an organic binder and a solvent that may be selected as appropriate for easy formation of the green sheet 14 and its proper bonding to the base precursors 13. The organic binder and the solvent are removed in a degreasing process before firing. The polyvinyl butyral binder is highly plastic and adhesive. The polyvinyl butyral binder can have higher plasticity and adhesiveness when heated to a temperature higher than its glass transition temperature Tg by greater than or equal to 30° C. Thus, the polyvinyl butyral binder with a relatively low glass transition temperature Tg and a plasticizer may be dissolved in a solvent mixture of ethanol and toluene, and the product may be mixed and dispersed into a slip of ceramic material to produce the green sheet 14. When the binder used for the green sheet 14 is the polyvinyl butyral resin binder, the plasticizer may be an ester that is highly compatible with the binder, for example, a phthalate ester such as dioctyl phthalate (DOP), bis(2-ethylhexyl) phthalate (DEHP), or dibutyl phthalate (DBP), a phosphate ester, or a fatty acid ester.

The elastic sheets 24*a* and 24*b* may be silicone rubber sheets. Each of the elastic sheets 24*a* and 24*b* may have a thickness of about 0.5 mm. The elastic sheets 24*a* and 24*b* can accommodate variations in the dimensions of the multiple base precursors 13, allowing efficient manufacture of the multilayer ceramic capacitor 1.

As illustrated in FIG. 13B, the elastic sheet 24*a* on which the base precursors 13 are placed with the support sheet 18 is then moved toward the elastic sheet 24*b* on which the green sheet 14 is placed. This causes the cut surfaces (first side surfaces 9*a*) to be pressed against the green sheet 14. The green sheet 14 thus comes in contact with and is press-bonded to the base precursors 13. The pressing force may be, for example, about 30 to 100 kg/cm$^2$. For tighter bonding, the base precursors 13 may be heated while being pressed. In this case, the pressing force can be reduced, thus reducing deformation of the base precursors 13 under pressure. FIG. 13C illustrates the base precursors 13 moved upward, with the green sheet 14 press-bonded to the base precursors 13. As illustrated in FIG. 13C, the green sheet 14 is bonded to the first side surfaces 9*a*, with portions of the green sheet 14 that are not in contact with the first side surfaces 9*a* remaining on the resin sheet 27. The green sheet 14 can be bonded to the second side surfaces 9*b* in the same manner as or in a similar manner to the process illustrated in FIGS. 13A, 13B, and 13C.

FIG. 14 illustrates the base components 2 before firing. The green sheet 14 for the protective layers 6 is bonded to each of the first side surfaces 9*a* and the second side surfaces 9*b*. Each of the base components 2 is degreased in a nitrogen atmosphere, and then fired in a mixed atmosphere of hydrogen and nitrogen to produce the base component 2 illustrated in FIG. 2.

The fired base components 2 then undergo barrel polishing. Barrel polishing is performed to round corners and remove burrs on the base components 2. Known barrel polishing may be performed. In the present embodiment, the base components 2 are placed in a pot containing an abrasive and water, and rotated.

The conductive paste for the underlayer in each of the external electrodes 3 is then applied to the end faces 8*a* and 8*b* and the main surfaces 7*a* and 7*b* of the base precursors 13 of the base components 2 by printing, and is then baked to form the underlayer in each of the external electrodes 3. The plating outer layer in each of the external electrodes 3 is then formed. This completes the multilayer ceramic capacitor 1 illustrated in FIG. 1. The conductive paste for the underlayer in each of the external electrodes 3 may contain Cu as the main component. The plating outer layer in each of the external electrodes 3 may be a Ni plating layer, a Sn plating layer, or a Cu plating layer. The external electrodes 3 may contain a conductive resin, for example, an epoxy resin containing a conductive filler such as a metal powder.

Figure 15:
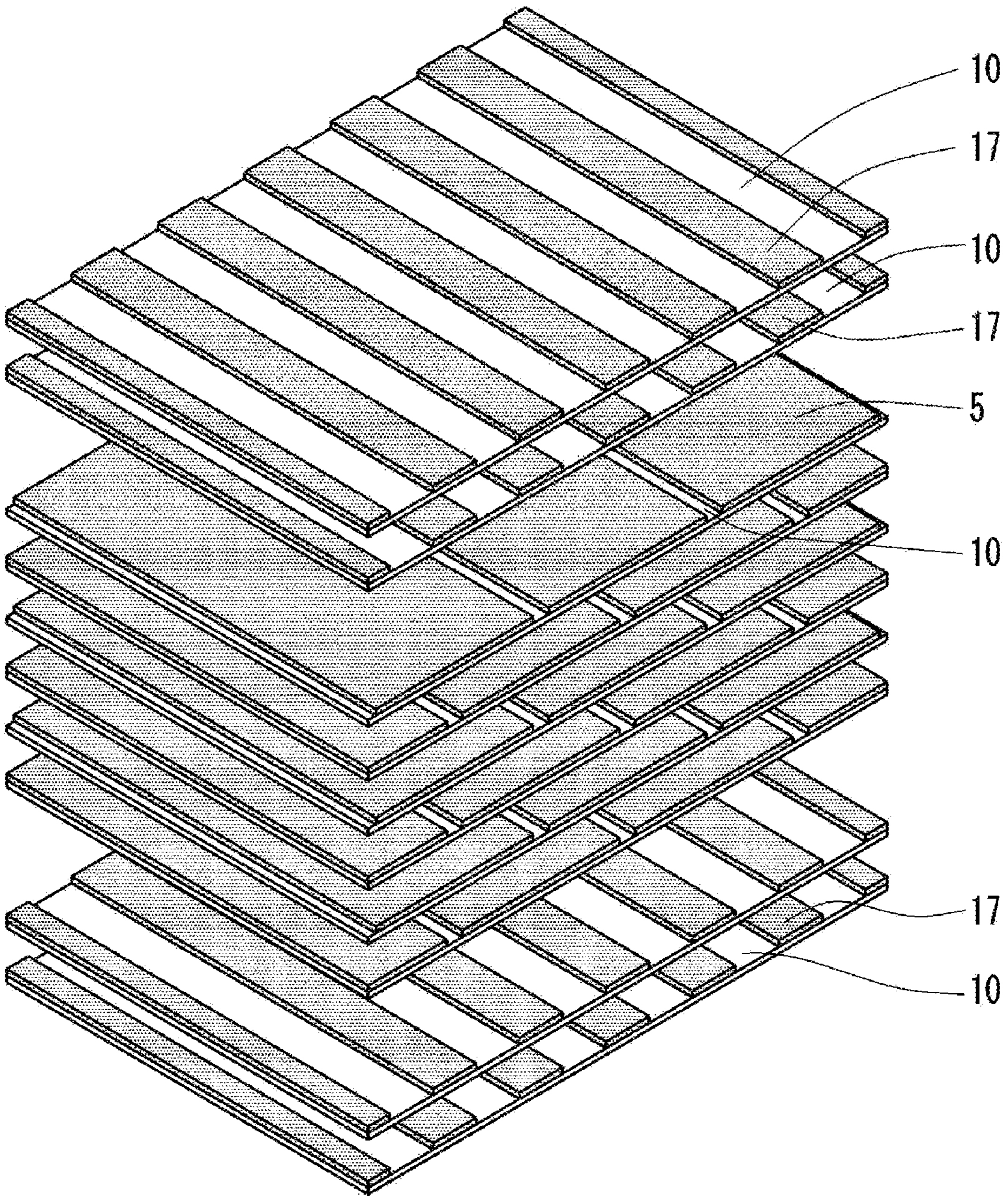
FIG. 15 is a perspective view of ceramic green sheets stacked on one another.
Figure 16:
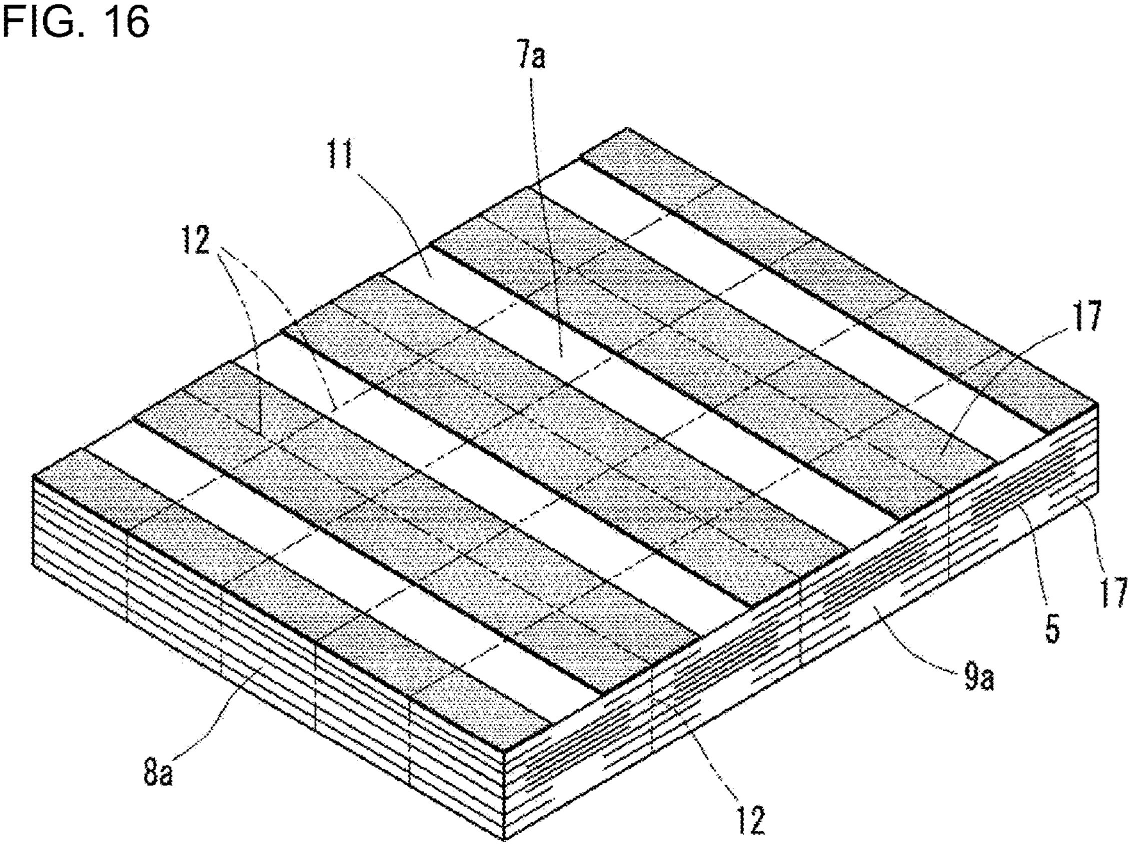
FIG. 16 is a perspective view of a multilayer base.
Figure 17:
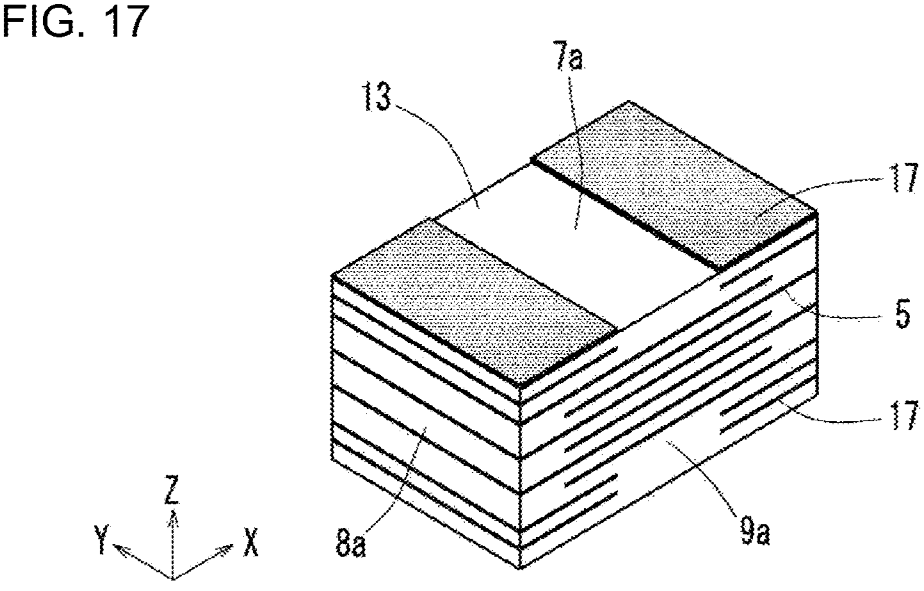
FIG. 17 is a perspective view of a base precursor.
Figure 18:
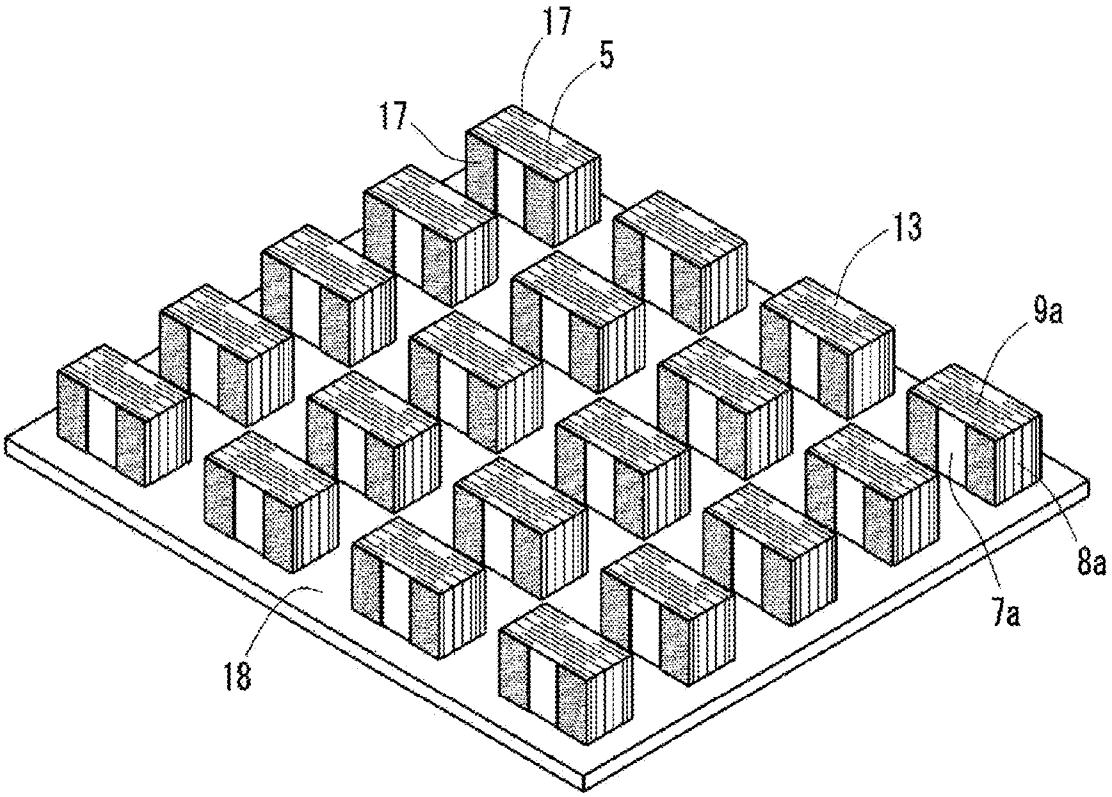
FIG. 18 is a perspective view of multiple base precursors arranged on the support sheet.
Figure 19:
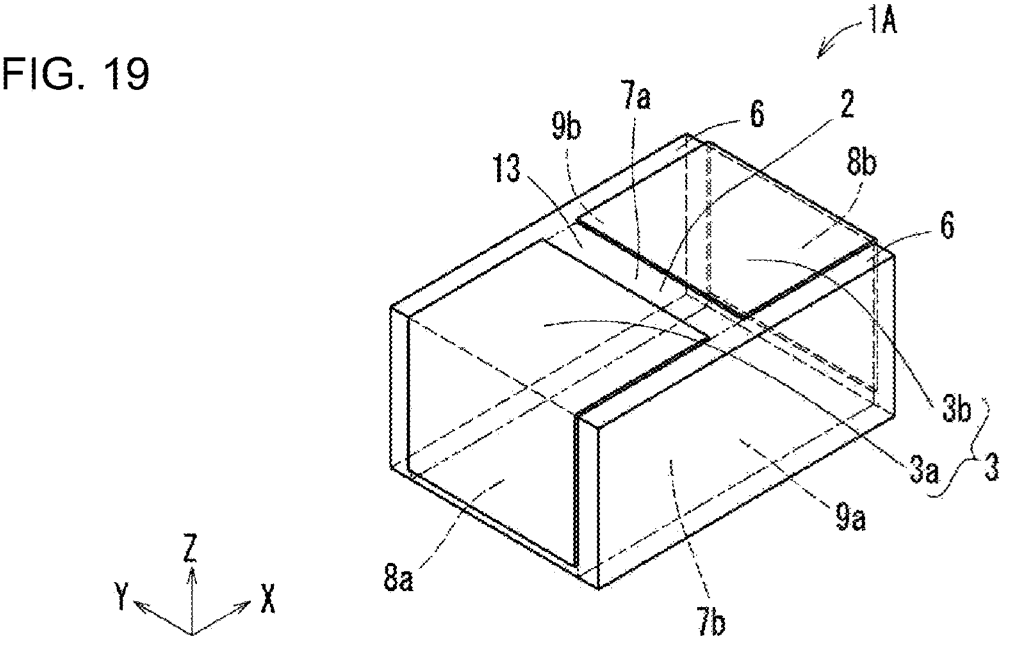
FIG. 19 is a perspective view of a multilayer ceramic capacitor.
Figure 20:
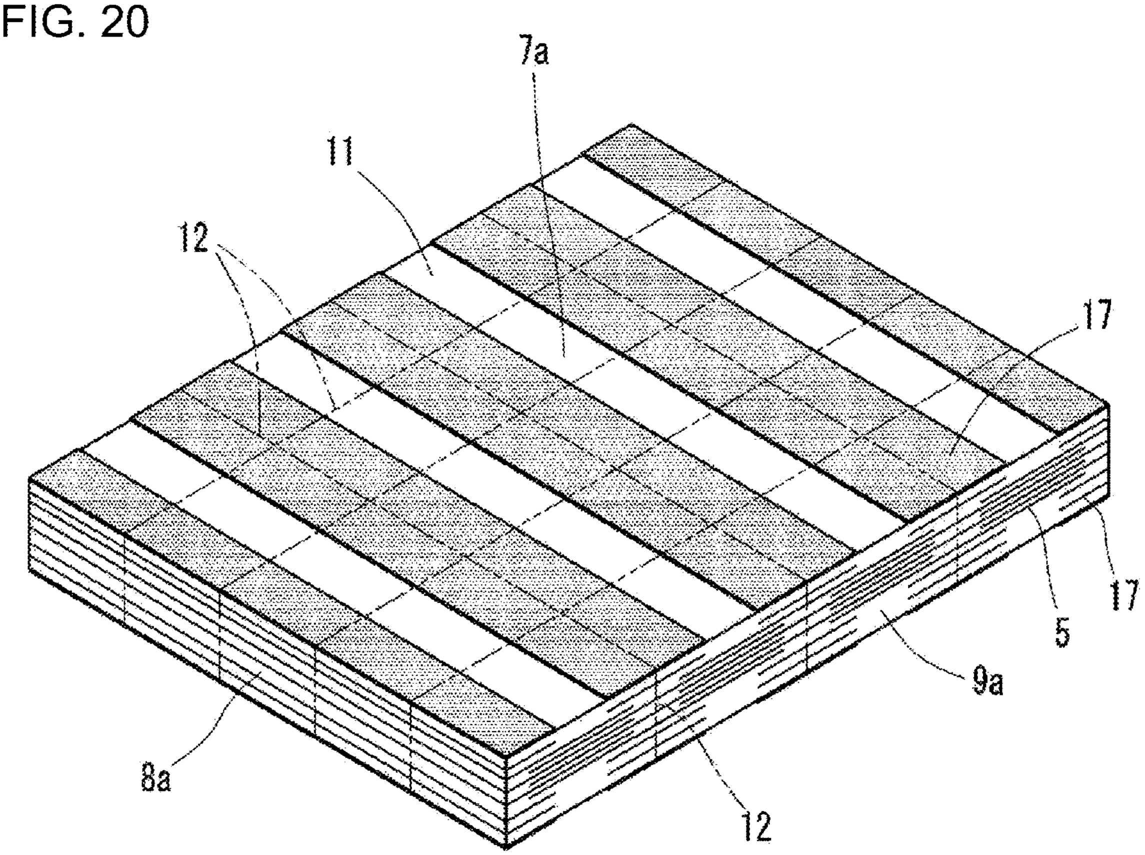
FIG. 20 is a perspective view of a multilayer base.
Figure 21:
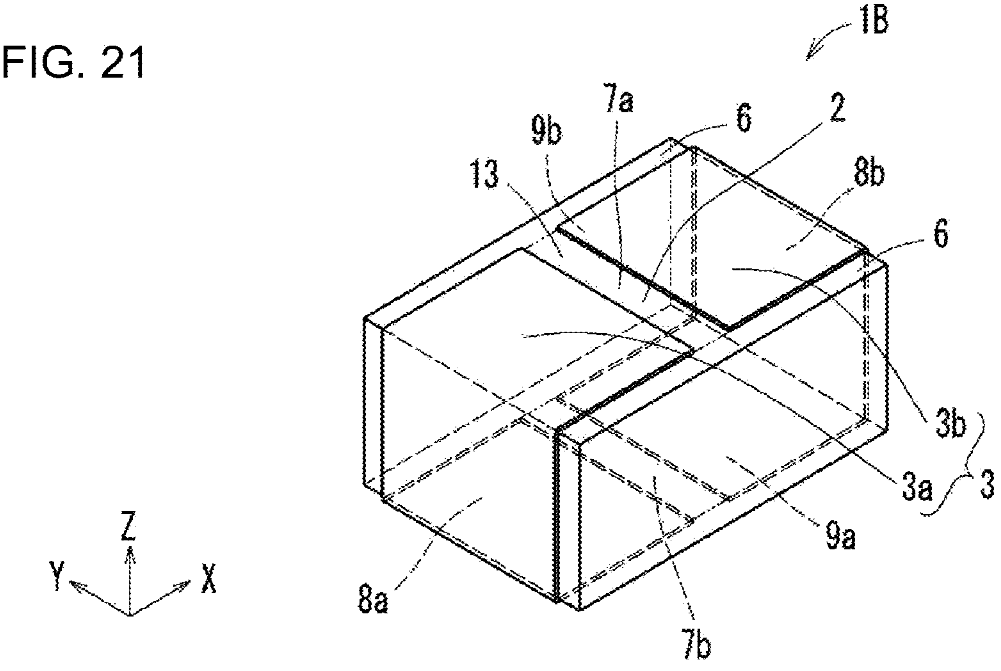
FIG. 21 is a perspective view of a multilayer ceramic capacitor.

A method for manufacturing a multilayer ceramic capacitor including the base precursor 13 illustrated in each of FIGS. 7A, 7B, and 7C will now be described. FIG. 15 is a perspective view of ceramic green sheets stacked on one another. FIG. 16 is a perspective view of a multilayer base. FIG. 17 is a perspective view of a base precursor. FIG. 18 is a perspective view of multiple base precursors arranged on the support sheet. FIG. 19 is a perspective view of a multilayer ceramic capacitor. FIG. 20 is a perspective view of a multilayer base. FIG. 21 is a perspective view of a multilayer ceramic capacitor.

The method for manufacturing the multilayer ceramic capacitor including the base precursor 13 illustrated in FIG. 7A is the same as or similar to the above method, and will not be described.

A method for manufacturing a multilayer ceramic capacitor (hereafter referred to as a multilayer ceramic capacitor 1A) including the base precursor 13 illustrated in FIG. 7B will now be described. The method for manufacturing the multilayer ceramic capacitor 1A is the same as the method for manufacturing the multilayer ceramic capacitor 1 up to the printing process illustrated in FIGS. 8A, 8B, and 8C, and will not be described. As illustrated in FIG. 15, in the stacking process of stacking the green sheets 10 with the printed electrode layers 5 and 17, the ceramic green sheets 10 for the second dielectric layers 16 with the printed dummy electrode layers 17 are stacked, with one of the dummy electrode layers 17 defining the first surface 7*a*. The multilayer base 11 illustrated in FIG. 16 is produced. The multilayer base 11 is then cut to obtain the base precursors 13, one of which is illustrated in FIG. 17. As illustrated in FIG. 18, the base precursors 13 are placed on the support sheet 18, with either the first side surfaces 9*a* or the second side surfaces 9*b* (first side surfaces 9*a*) being open. As described with reference to FIGS. 13A, 13B, and 13C, the green sheet 14 for the protective layers 6 is bonded to each of the side surfaces 9*a* and 9*b*. The base components 2 are then fired. The fired base components 2 undergo barrel polishing to chamfer the corners and remove an oxide film on the surfaces of the electrode layers 5 and 17 exposed on the end faces 8*a* and 8*b* and the side surfaces 9*a* and 9*b* of the base precursors 13. The end faces 8*a* and 8*b* of the base components 2 then undergo electroless Cu plating to form a continuous underlayer using the exposed portions of the electrode layers 5 and 17 as nuclei. The surface of the underlayer then undergoes Ni electroplating and Sn electroplating. This completes the multilayer ceramic capacitor 1A including the thin external electrodes 3 on the end faces 8*a* and 8*b* and the first surface 7*a* as illustrated in FIG. 19.

A method for manufacturing a multilayer ceramic capacitor (hereafter referred to as a multilayer ceramic capacitor 1B) including the base precursor 13 illustrated in FIG. 7C will now be described. FIG. 20 illustrates the multilayer base 11 to be cut into the base precursors 13, one of which is illustrated in FIG. 7C. In the multilayer base 11 illustrated in FIG. 20, each of the first surface 7*a* and the second surface 7*b* is defined by the dummy electrode layer 17. The multilayer base 11 illustrated in FIG. 20 can be produced by printing the dummy electrode layer 17 on the lower surface of the multilayer base 11 illustrated in FIG. 16. The multilayer base 11 illustrated in FIG. 20 is cut to obtain the base precursors 13, one of which is illustrated in FIG. 7C. The subsequent processes are the same as or similar to those with the method for manufacturing the multilayer ceramic capacitor 1A. This completes the multilayer ceramic capacitor 1B illustrated in FIG. 21 including the thin external electrodes 3 extending from the end faces 8*a* and 8*b* to the first surface 7*a* and the second surface 7*b*. The multilayer base 11 illustrated in FIG. 20 may be produced by inverting the green sheet 10 on the lower surface in the stacking process illustrated in FIG. 15.

The multilayer ceramic electronic component according to one or more embodiments of the present disclosure is less likely to have lower reliability when the protective layers are thinner.

The multilayer ceramic electronic component according to one or more embodiments of the present disclosure may have aspects (1) to (6) described below.

(1) A multilayer ceramic electronic component, comprising:

a stack being a substantially rectangular prism, the stack including an active portion and covers at two ends of the active portion in a predetermined direction, the active portion including a plurality of first dielectric layers and a plurality of internal electrode layers alternately stacked on one another in the predetermined direction, the stack including a first surface and a second surface opposite to each other in the predetermined direction, a first side surface and a second side surface opposite to each other, and a first end face and a second end face opposite to each other;

a first external electrode extending from the first end face to at least one of the first surface or the second surface;

a second external electrode extending from the second end face to the at least one of the first surface or the second surface; and protective layers on the first side surface and the second side surface, the protective layers containing a same main component as the plurality of first dielectric layers, wherein the first external electrode is connected to an internal electrode layer of the plurality of internal electrode layers, and the second external electrode is connected to an internal electrode layer of the plurality of internal electrode layers different from the internal electrode layer connected to the first external electrode, each of the protective layers has a thickness less than or equal to 30 μm, and each of the covers includes a plurality of second dielectric layers and a plurality of dummy electrode layers alternately stacked on one another in the predetermined direction, the plurality of second dielectric layers contains a same main component as the plurality of first dielectric layers, the plurality of dummy electrode layers contains a same main component as the plurality of internal electrode layers, and an interval between the plurality of dummy electrode layers is one to eight times inclusive an interval between the plurality of internal electrode layers.

(2) The multilayer ceramic electronic component according to aspect (1), wherein the plurality of internal electrode layers and the plurality of dummy electrode layers have a same length in a direction perpendicular to the first side surface.

(3) The multilayer ceramic electronic component according to aspect (1) or aspect (2), wherein each of the plurality of dummy electrode layers includes a first dummy electrode layer extending from the first end face toward the second end face, and a second dummy electrode layer extending from the second end face toward the first end face, and the first dummy electrode layer and the second dummy electrode layer are electrically insulated from each other.

(4) The multilayer ceramic electronic component according to aspect (3), wherein each of the plurality of dummy electrode layers further includes at least one third dummy electrode layer, and the at least one third dummy electrode layer is located between the first dummy electrode layer and the second dummy electrode layer and is electrically insulated from the first dummy electrode layer and the second dummy electrode layer.

(5) The multilayer ceramic electronic component according to any one of aspects (1) to (4), wherein each of the plurality of dummy electrode layers has a thickness 1.5 to 2.5 times inclusive a thickness of each of the plurality of internal electrode layers.

(6) The multilayer ceramic electronic component according to any one of aspects (1) to (5), wherein each of the protective layers has a thickness greater than or equal to 5 μm.

Although embodiments of the present disclosure have been described in detail, the present disclosure is not limited to the embodiments, and may be changed or varied in various manners without departing from the spirit and scope of the present disclosure. The components described in the above embodiments may be entirely or partially combined as appropriate unless any contradiction arises.

REFERENCE SIGNS

1, 1A, 1B multilayer ceramic electronic component (multilayer ceramic capacitor)
2 base component
3 external electrode
3*a* first external electrode
3*b* second external electrode
4 first dielectric layer
5 internal electrode layer
6 protective layer
7*a* first surface
7*b* second surface
8*a* first end face
8*b* second end face
9*a* first side surface
9*b* second side surface
10 ceramic green sheet

11 multilayer base
12 cutting line
13 stack (base precursor)
14 ceramic green sheet
16 second dielectric layer
17 dummy electrode layer
17*a* first dummy electrode layer
17*b* second dummy electrode layer
17*c* third dummy electrode layer
18 support sheet
19 active portion
20 cover
24*a*, 24*b* elastic sheet
27 resin sheet

The invention claimed is:

1. A multilayer ceramic electronic component, comprising:

a stack being a substantially rectangular prism, the stack including an active portion and covers at two ends of the active portion in a predetermined direction, the active portion including a plurality of first dielectric layers and a plurality of internal electrode layers alternately stacked on one another in the predetermined direction, the stack including a first surface and a second surface opposite to each other in the predetermined direction, a first side surface and a second side surface opposite to each other, and a first end face and a second end face opposite to each other;

a first external electrode extending from the first end face to at least one of the first surface or the second surface;

a second external electrode extending from the second end face to the at least one of the first surface or the second surface; and protective layers on the first side surface and the second side surface, the protective layers containing a same main component as the plurality of first dielectric layers, wherein the first external electrode is connected to an internal electrode layer of the plurality of internal electrode layers, and the second external electrode is connected to an internal electrode layer of the plurality of internal electrode layers different from the internal electrode layer connected to the first external electrode, each of the protective layers has a thickness less than or equal to 30 μm, and each of the covers includes a plurality of second dielectric layers and a plurality of dummy electrode layers alternately stacked on one another in the predetermined direction, the plurality of second dielectric layers contains a same main component as the plurality of first dielectric layers, the plurality of dummy electrode layers contains a same main component as the plurality of internal electrode layers, and an interval between the plurality of dummy electrode layers is one to eight times inclusive an interval between the plurality of internal electrode layers.

2. The multilayer ceramic electronic component according to claim 1, wherein the plurality of internal electrode layers and the plurality of dummy electrode layers have a same length in a direction perpendicular to the first side surface.

3. The multilayer ceramic electronic component according to claim 1, wherein each of the plurality of dummy electrode layers includes a first dummy electrode layer extending from the first end face toward the second end face, and a second dummy electrode layer extending from the second end face toward the first end face, and the first dummy electrode layer and the second dummy electrode layer are electrically insulated from each other.

4. The multilayer ceramic electronic component according to claim 3, wherein each of the plurality of dummy electrode layers further includes at least one third dummy electrode layer, and the at least one third dummy electrode layer is located between the first dummy electrode layer and the second dummy electrode layer and is electrically insulated from the first dummy electrode layer and the second dummy electrode layer.

5. The multilayer ceramic electronic component according to claim 1, wherein each of the plurality of dummy electrode layers has a thickness 1.5 to 2.5 times inclusive a thickness of each of the plurality of internal electrode layers.

6. The multilayer ceramic electronic component according to claim 1, wherein each of the protective layers has a thickness greater than or equal to 5 μm.

* * * * *